United States Patent
Suzuki

(10) Patent No.: US 10,515,297 B2
(45) Date of Patent: Dec. 24, 2019

(54) RECOGNITION DEVICE, RECOGNITION METHOD, AND COMPUTER PROGRAM PRODUCT

(71) Applicants: KABUSHIKI KAISHA TOSHIBA, Minato-ku, Tokyo (JP); TOSHIBA DIGITAL SOLUTIONS CORPORATION, Kawasaki-shi, Kanagawa (JP)

(72) Inventor: Tomohisa Suzuki, Yokohama Kanagawa (JP)

(73) Assignees: KABUSHIKI KAISHA TOSHIBA, Tokyo (JP); TOSHIBA DIGITAL SOLUTIONS CORPORATION, Tokyo (JP)

(*) Notice: Subject to any disclaimer, the term of this patent is extended or adjusted under 35 U.S.C. 154(b) by 167 days.

(21) Appl. No.: 15/709,774

(22) Filed: Sep. 20, 2017

(65) Prior Publication Data
US 2018/0012111 A1    Jan. 11, 2018

Related U.S. Application Data

(63) Continuation of application No. PCT/JP2015/063482, filed on May 11, 2015.

(51) Int. Cl.
*G06K 9/00* (2006.01)
*G06K 9/72* (2006.01)
(Continued)

(52) U.S. Cl.
CPC ............ *G06K 9/723* (2013.01); *G06K 9/34* (2013.01); *G06K 9/6204* (2013.01);
(Continued)

(58) Field of Classification Search
None
See application file for complete search history.

(56) References Cited

U.S. PATENT DOCUMENTS 6,246,794 B1  6/2001  Kagehiro et al.
8,190,632 B2 * 5/2012  Tago .................. G06F 16/9027
                                         707/770
(Continued)

FOREIGN PATENT DOCUMENTS

JP    09-185681    7/1997
JP    11-143893    5/1999
(Continued)

OTHER PUBLICATIONS

International Search Report for International Patent Application No. PCT/JP2015/063482 dated Jul. 21, 2015, 4 pages.
(Continued)

*Primary Examiner* — Soo Jin Park
(74) *Attorney, Agent, or Firm* — Amin, Turocy & Watson, LLP

(57) ABSTRACT

According to an embodiment, a recognition device includes a detector, a recognizer, and a matcher. The detector is configured to detect a character candidate from an input image. The recognizer is configured to generate recognition candidate from the character candidate. The matcher is configured to match the recognition candidate with a knowledge dictionary and contains modeled character strings to be recognized, and generate a matching result obtained by matching a character string presumed to be included in the input image with the dictionary. Any one of a real character code that represents a character and a virtual character code that specifies a command is assigned to an edge. The matcher gives, when shifting a state of the dictionary in accordance with an edge to which the virtual character code (Continued)

is assigned, a command specified by the virtual character code assigned to the edge to a command processor.

8 Claims, 23 Drawing Sheets

(51) Int. Cl.
    *G06K 9/62*     (2006.01)
    *G06K 9/34*     (2006.01)

(52) U.S. Cl.
    CPC .............. *G06K 9/6277* (2013.01); *G06K 9/72* (2013.01); *G06K 2209/011* (2013.01)

(56) References Cited

U.S. PATENT DOCUMENTS

| | | | |
|---|---|---|---|
| 8,560,475 B2 * | 10/2013 | Hussain | G06F 9/4498 706/45 |
| 8,725,749 B2 * | 5/2014 | Horne | G06F 16/90344 707/756 |
| 9,852,217 B2 * | 12/2017 | Yahav | G06F 16/70 |
| 2016/0063102 A1 * | 3/2016 | Yahav | G06F 16/70 382/182 |

FOREIGN PATENT DOCUMENTS

| | | |
|---|---|---|
| JP | 2000-148906 | 5/2000 |
| JP | 4006176 | 11/2007 |

OTHER PUBLICATIONS

Written Opinion for International Patent Application No. PCT/JP2015/063482 dated Jul. 21, 2015, 3 pages.

Marukawa, et al. "An Error Correction Algorithm for Handwritten Kanji Address Recognition", The Information Processing Society of Japan, vol. 35, No. 6, Jun. 15, 1994, pp. 1101-1110.

* cited by examiner

FIG.3

ORDER FORM

| ZIP CODE | 123-4567 | TELEPHONE NUMBER | 890-1234-5678 |
|---|---|---|---|
| ADDRESS | | TOKYO CHARACTER RECOGNITION CITY KNOWLEDGE PROCESSING TOWN 9-12-34 | |
| NAME | | 大林一郎 | |

| PRODUCT CODE | PRODUCT NAME | QUAN-TITY | UNIT PRICE | AMOUNT |
|---|---|---|---|---|
| A00200 | BALL-POINT PEN | 20 | ¥1200 | ¥24000 |
| B00300 | ERASER | 10 | ¥800 | ¥8000 |
|  |  |  |  |  |
|  |  |  |  |  |
|  |  |  |  |  |

FIG.5
INPUT IMAGE
| ORDER FORM | | | |
|---|---|---|---|
| ZIP CODE | 123-4567 | TELEPHONE NUMBER | 890-1234-5678 |
| ADDRESS | TOKYO  CHARACTER RECOGNITION CITY KNOWLEDGE PROCESSING TOWN<br>9-12-34 | | |
| NAME | 大林一郎 | | |
↓ EXTRACTION AND BINARIZATION
BINARY IMAGE
大林一郎
↓ LABELING
FRAGMENTS
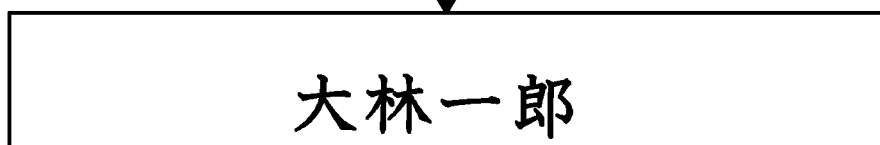
↓ GENERATE BY COMBINING
CHARACTER CANDIDATES
 0   2   4   6   8  10 ← CHARACTER CANDIDATE NUMBER
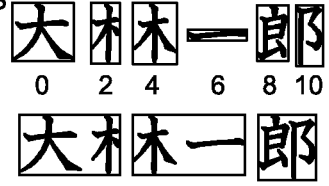
 1       5       9
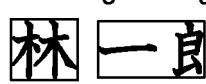    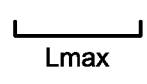
 3       7                Lmax

FRAGMENT NUMBER  0  1  2  3  4  5

FIG.11

|   | END POINT NUMBER | | | | | | |
|---|---|---|---|---|---|---|---|
|   | 0 | 1 | 2 | 3 | 4 | 5 | 6 |
| 0 | -1 | 0 | 1 | -1 | -1 | -1 | -1 |
| 1 | -1 | -1 | 2 | 3 | -1 | -1 | -1 |
| 2 | -1 | -1 | -1 | 4 | 5 | -1 | -1 |
| 3 | -1 | -1 | -1 | -1 | 6 | 7 | -1 |
| 4 | -1 | -1 | -1 | -1 | -1 | 8 | 9 |
| 5 | -1 | -1 | -1 | -1 | -1 | -1 | 10 |

START POINT NUMBER

0: REAL CHARACTER CODE
1: VIRTUAL CHARACTER CODE

POSITION NUMBER 0　1　2　3=Pst　4　5　6

CHECK INTERVAL OF FRAGMENTS BEFORE AND
AFTER POSITION NUMBER Pst

RECOGNITION DEVICE, RECOGNITION METHOD, AND COMPUTER PROGRAM PRODUCT

CROSS-REFERENCE TO RELATED APPLICATION

This application is a continuation of PCT international application Ser. No. PCT/JP2015/063482 filed on May 11, 2015, the entire contents of which are incorporated herein by reference.

FIELD

An embodiment described herein relates generally to a recognition device, a recognition method, and a computer program product.

BACKGROUND

As a method for performing knowledge processing in character recognition, known has been a method that character strings to be recognized are modeled and stored in a knowledge dictionary and that a character string that matches the model is used as a result of the knowledge dictionary. For example, known has been a system that includes a word dictionary unit registering words to be matched and a word matcher including a finite automaton that accepts a word registered in the word dictionary unit, and that outputs the word that the automaton accepted as a result of the knowledge processing (for example, see Japanese Patent Application Laid-open No. H11-143893). Furthermore, known has been a technique for performing knowledge processing by matching a place-name notation described in context-free grammar with character recognition candidates (for example, see Japanese Patent No. 4006176).

In the conventional technologies, however, it has been difficult to perform processing different from the knowledge processing such as detecting a space between a character string and a character string and reflecting the detection result of the space on a matching score, in synchronization with the knowledge processing.

BRIEF DESCRIPTION OF THE DRAWINGS

FIG. 3 is a diagram illustrating one example of an input image;

FIG. 5 is a diagram illustrating processing of generating a series of character candidates from the input image;

FIG. 11 is a diagram illustrating one example of a character candidate matrix;

DETAILED DESCRIPTION

According to an embodiment, a recognition device includes a candidate detector, a recognizer, a matcher, and a command processor. The candidate detector is configured to detect a character candidate that is a set of pixels presumed to contain a character from an input image. The recognizer is configured to recognize each character candidate and generate at least one recognition candidate that is a candidate character of a recognition result. The matcher is configured to match each of the at least one recognition candidate with a knowledge dictionary that contains modeled character strings to be recognized, and generate a matching result obtained by matching a character string presumed to be included in the input image with the knowledge dictionary. The command processor configured to execute a given command. The knowledge dictionary is a finite automaton, and any one of a real character code that represents a character and a virtual character code that specifies a command is assigned to an edge. The matcher gives, when shifting a state of the knowledge dictionary in accordance with an edge to which the virtual character code is assigned, a command specified by the virtual character code assigned to the edge to the command processor.

Figure 1:
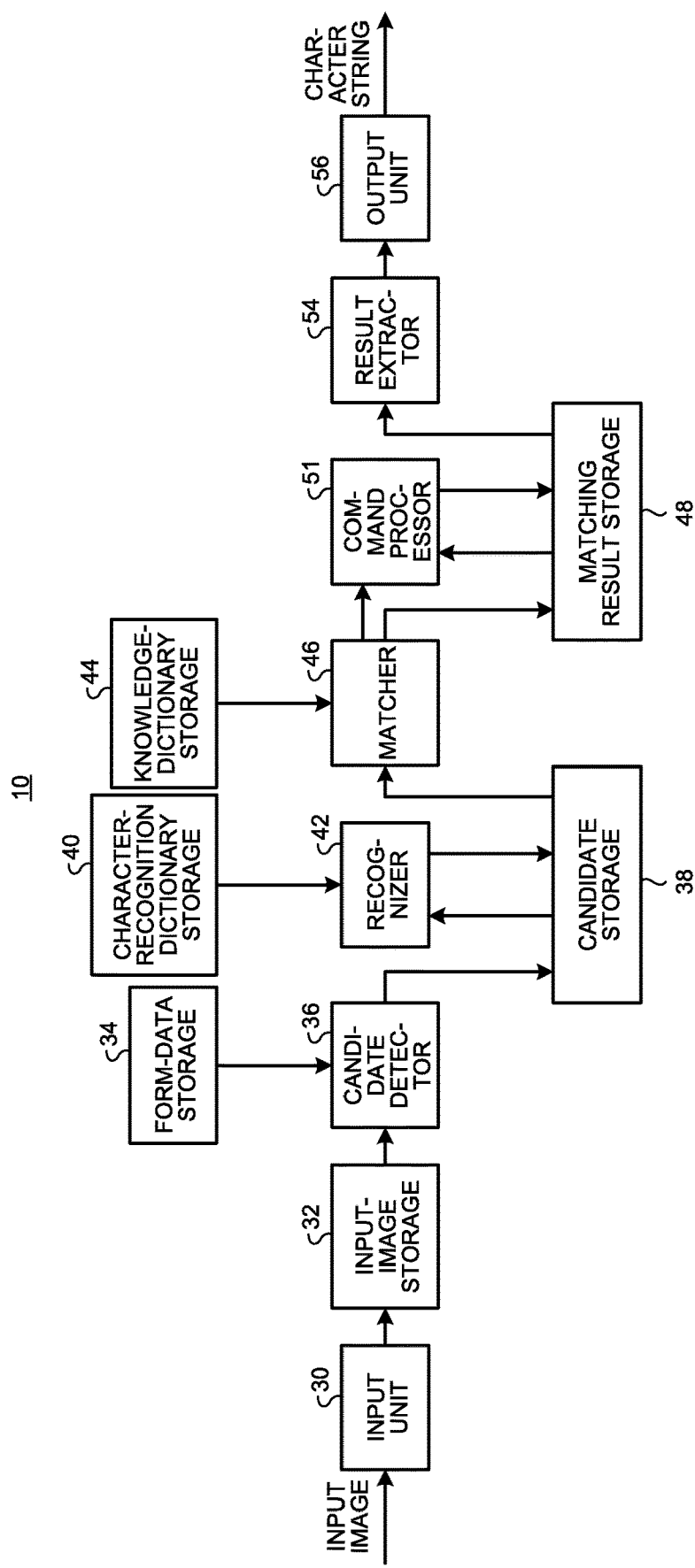
FIG. 1 is a block diagram illustrating a configuration of a recognition device 10 according to an embodiment.

FIG. 1 is a block diagram illustrating a configuration of a recognition device 10 according to an embodiment. The recognition device 10 recognizes a character string included in an input image read by a scanner or the like, and outputs the recognized character string, for example.

The recognition device 10 includes an input unit 30, an input-image storage 32, a form-data storage 34, a candidate detector 36, a candidate storage 38, a character-recognition dictionary storage 40, a recognizer 42, a knowledge-dictionary storage 44, a matcher 46, a matching-result storage 48, a command processor 51, a result extractor 54, and an output unit 56.

The input unit 30 inputs an input image captured by a scanner or the like. The input unit 30 may input an input image from another computer via a network and the like. The input-image storage 32 stores therein the input image that is input by the input unit 30.

The form-data storage 34 stores therein form data specifying an area in which a character string in the input image is written.

The candidate detector 36 detects character candidates from the input image based on the form data stored in the form-data storage 34. Each character candidate is a set of pixels presumed to contain a single character. The candidate detector 36 writes the detected character candidate into the candidate storage 38.

The candidate storage 38 stores therein character candidates. The candidate storage 38 further stores therein recognition candidates, which are candidate characters of recognition results of the character candidate, in association with each character candidate.

The character-recognition dictionary storage 40 stores therein a character recognition dictionary. The character recognition dictionary stores therein information for calculating the degree of similarity between an image to be recognized and each character registered beforehand.

The recognizer 42 recognizes each of the character candidates stored in the candidate storage 38 based on the character recognition dictionary stored in the character-recognition dictionary storage 40. The recognizer 42 then generates at least one recognition candidate representing a candidate character of the recognition result for a single character candidate. The recognizer 42 writes the generated at least one recognition candidate into the candidate storage 38, in association with the character candidate.

The knowledge-dictionary storage 44 stores therein a knowledge dictionary that contains modeled character strings to be recognized. In the present embodiment, the knowledge dictionary is a deterministic finite automaton that contains modeled character strings to be recognized. In the knowledge dictionary, any one of a real character code that represents a character and a virtual character code that specifies a command is assigned to an edge.

The matcher 46 matches each of at least one recognition candidate with the knowledge dictionary and generates a matching result obtained by matching a character string presumed to be included in the input image with the knowledge dictionary. In this process, the matcher 46 performs the matching by sequentially shifting the state of the knowledge dictionary in accordance with edges to which the recognition candidates are assigned. The matcher 46 further generates a matching result that includes a score representing the likelihood of the corresponding character string. The matcher 46 then writes the generated matching result into the matching-result storage 48.

Moreover, when shifting the state of the knowledge dictionary in accordance with an edge to which a virtual character code is assigned, the matcher 46 gives a command specified by the virtual character code assigned to the edge to the command processor 51.

The matching-result storage 48 stores therein the matching results generated by the matcher 46. The matching-result storage 48 stores the matching results at the start point, the intermediate stage, and the completion point in the course of matching, from the head, a character string obtained by arranging the recognition candidates of the character candidate with the knowledge dictionary. The matcher 46 may delete the matching result with a low score in the intermediate stage of matching for the purpose of saving a storage area.

The command processor 51 executes a command given from the matcher 46. The command processor 51 executes, as one example, processing of adding a specified value to a score, or processing of checking a space between characters.

The result extractor 54 selects one or more matching results based on the score from the matching results stored in the matching-result storage 48 after the matching by the matcher 46 and the processing by the command processor 51 are all completed, and extracts a character string identified by the selected one or more matching results. The result extractor 54 extracts, as one example, a character string identified by the matching result having the best score.

The output unit 56 outputs the character string extracted by the result extractor 54 to the outside.

Figure 2:
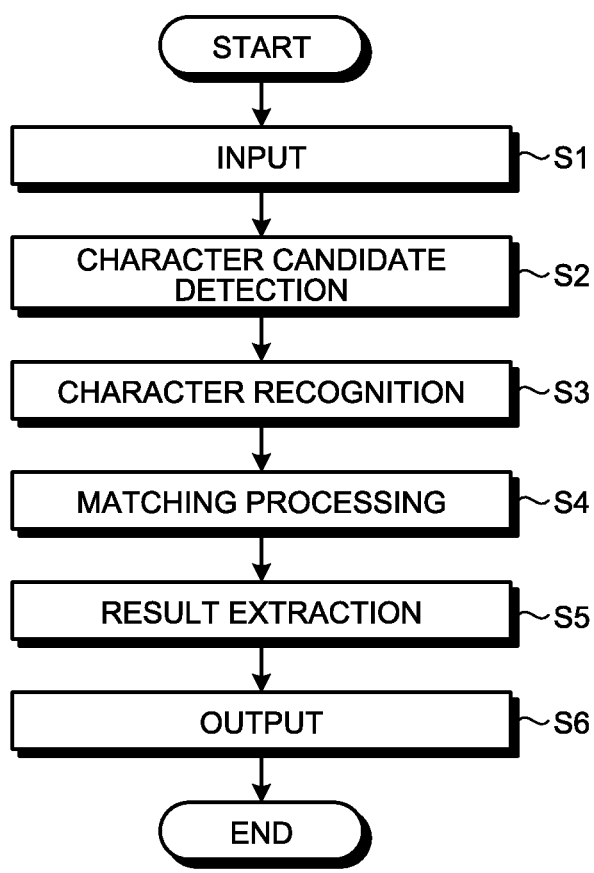
FIG. 2 is a flow diagram illustrating processing of the recognition device 10 in the embodiment.

FIG. 2 is a flow diagram illustrating processing of the recognition device 10 in the embodiment. First, at Step S1, the recognition device 10 inputs an input image.

Subsequently, at Step S2, the recognition device 10 detects a character candidate that is a set of pixels presumed to contain a single character from the input image. Then, at Step S3, the recognition device 10 recognizes each character candidate based on the character recognition dictionary and generates at least one recognition candidate that is a candidate character of the recognition result.

Then, at Step S4, the recognition device 10 matches each of at least one recognition candidate with the knowledge dictionary and generates a matching result obtained by matching a character string presumed to be included in the input image with the knowledge dictionary. Along with this, at Step S4, when shifting the state of the knowledge dictionary in accordance with an edge to which a virtual character code is assigned, the recognition device 10 executes a command specified by the virtual character code assigned to the edge.

Subsequently, at Step S5, the recognition device 10 selects a single matching result based on the score from the matching results after all matching processing is completed, extracts a character string identified by the selected matching result, and sets the extracted character string as a character string of the recognition result. When the number of character candidates is zero, that is, when no character is included in the input image, no matching results to select are generated at Step S5. In this case, the character string of the recognition result is set to a null string. Lastly, at Step S6, the recognition device 10 outputs the character string of the recognition result.

FIG. 3 is a diagram illustrating one example of an input image. In the present embodiment, as illustrated in FIG. 3, the input image is image data obtained by capturing an order form for ordering a product with a scanner or the like. Inside a predetermined entry frame of the input image, the name of an orderer is filled out. In the present embodiment, the recognition device 10 recognizes the character string of a Japanese name filled out inside the predetermined entry frame and outputs text data representing the recognized character string.

Figure 4:
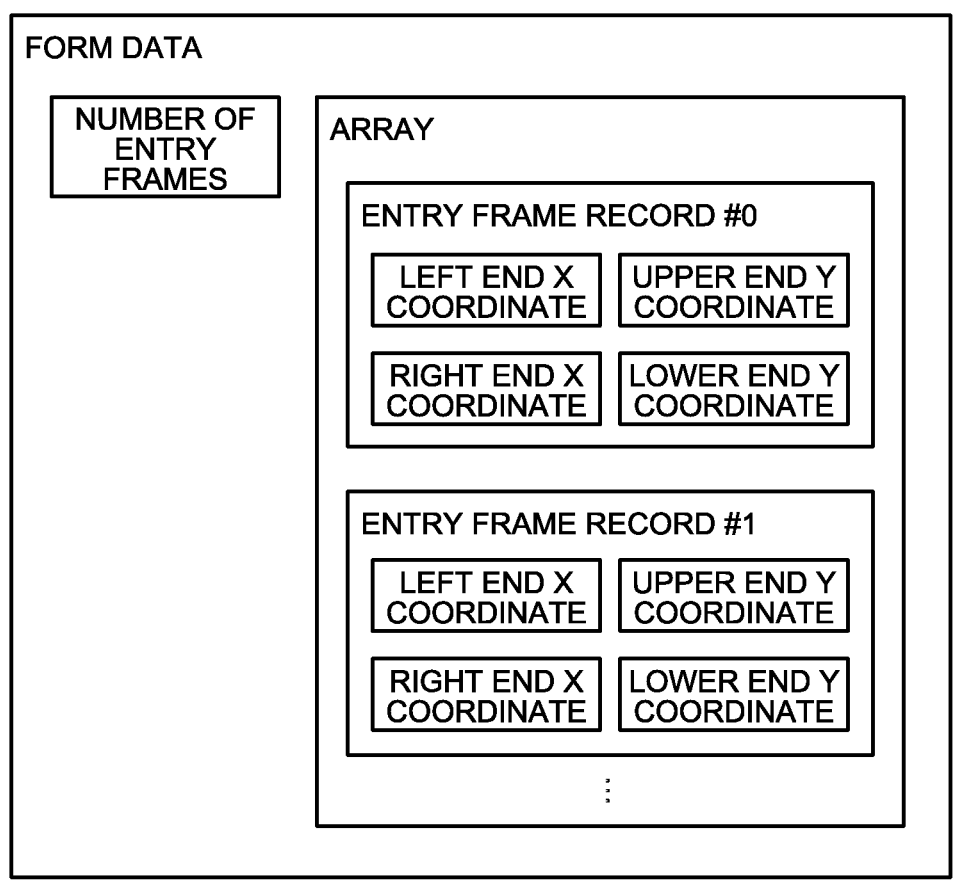
FIG. 4 is a diagram illustrating a configuration of form data.

FIG. 4 is a diagram illustrating a configuration of form data. The form-data storage 34 stores therein the form data prepared beforehand.

The form data, as illustrated in FIG. 4, includes a value indicating the number of entry frames included in the input image, and an array that stores therein entry frame records for the number of entry frames. In this example, an index of the first entry of the array is zero. That is, the array is zero origin. Other arrays used in the present embodiment are zero origin unless otherwise noted specifically. Each entry frame record corresponds to each entry frame included in the input image on a one-to-one basis.

Each entry frame record includes information indicating the position of the corresponding entry frame in the input image. In this example, the information indicating the position of the entry frame is an X coordinate (a coordinate in lateral direction) of the left and right ends of the corresponding entry frame and a Y coordinate (a coordinate in longitudinal direction) of the upper and lower ends.

FIG. 5 is a diagram illustrating processing of generating a series of character candidates from the input image. The candidate detector 36 identifies the area of the entry frame (for example, the area surrounded by the dotted line in FIG. 5) based on the information indicated in the entry frame record and extracts a partial area image from the identified area. Then, the candidate detector 36 binarizes the extracted partial area image and generates a binary image. Subsequently, the candidate detector 36 extracts connected components of black pixels on the binary image and performs labeling for each connected component. Each labeled connected component is an element constituting a character and is referred to as a fragment. The candidate detector 36 then combines one or more fragments arranged consecutively and generates a character candidate. The character candidate is a set of pixels presumed to represent a single character.

Figure 6:
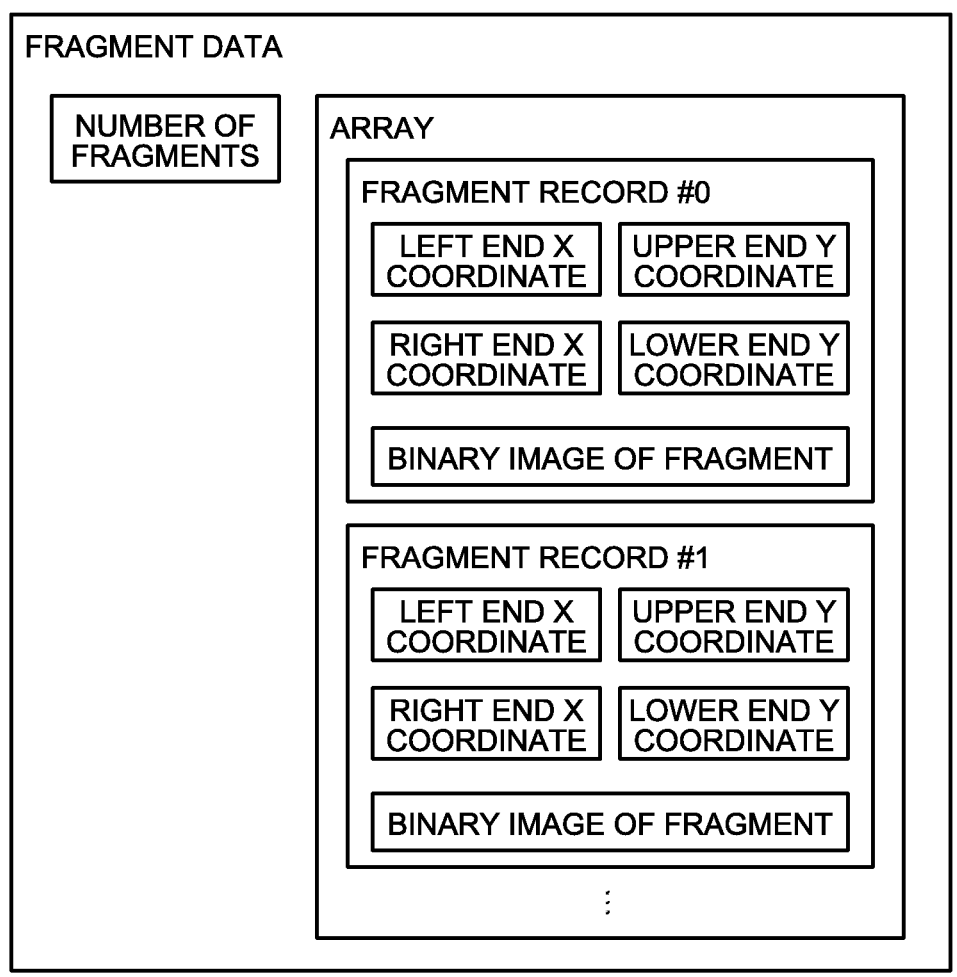
FIG. 6 is a diagram illustrating a configuration of fragment data.

FIG. 6 is a diagram illustrating a configuration of fragment data. The candidate storage 38 stores therein fragment data representing fragments. The fragment data, as illustrated in FIG. 6, includes a value indicating the number of fragments, and an array that stores therein fragment records for the number of fragments. Each fragment record corresponds to each fragment on a one-to-one basis.

Each fragment record includes information indicating the position of the corresponding fragment, and a binary image indicating the shape of the fragment. In this example, the information indicating the position of the fragment is the X coordinate of the left and right ends of the corresponding fragment and the Y coordinate of the upper and lower ends, and indicates a circumscribed rectangle of the fragment. The binary image indicating the shape of the fragment is an image that the pixels on the connected components are black pixels within the circumscribed rectangle of the fragment and the remains are white pixels.

The candidate detector 36 calculates the X coordinate of the center and the Y coordinate of the center for each fragment. The X coordinate of the center is the average value of the X coordinate of the left and right ends. The Y coordinate of the center is the average value of the Y coordinate of the upper and lower ends. Then, the candidate detector 36 aligns a plurality of fragment records in the array in ascending order of the X coordinate of the center. Accordingly, the candidate detector 36 can align the fragment records in the array in the character entry direction (in this example, the direction from left to right) in the entry frame.

Figure 7:
FIG. 7 is a diagram illustrating one example of fragment numbers.

FIG. 7 is a diagram illustrating one example of fragment numbers. Each fragment record is identified by an index of the array. The index after aligning the fragment records in the character entry direction is referred to as a fragment number. Thus, each fragment is associated with the fragment number as illustrated in FIG. 7.

Figure 8:
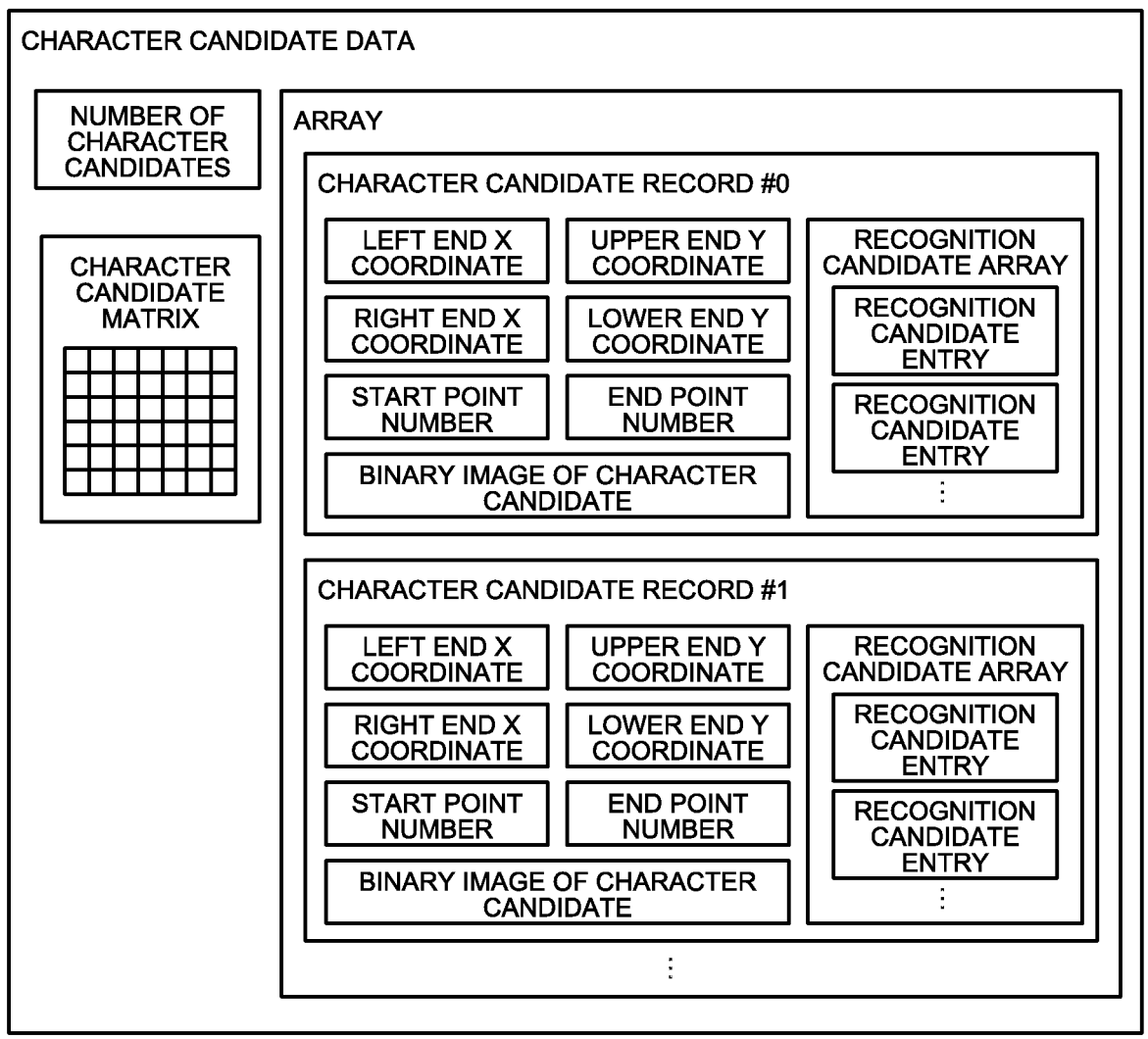
FIG. 8 is a diagram illustrating a configuration of character candidate data.

FIG. 8 is a diagram illustrating a configuration of character candidate data. The candidate detector 36 combines one or more fragments arranged consecutively and generates a character candidate. In this process, the candidate detector 36 combines one or more fragments in all patterns for which the breadth L of the circumscribed rectangle is equal to or shorter than a predetermined length (Lmax), and generates character candidates.

The candidate storage 38 stores therein character candidate data representing character candidates. The character candidate data, as illustrated in FIG. 8, includes a value indicating the number of generated character candidates, a character candidate matrix (described later in detail), and an array that stores therein character candidate records for the number of character candidates. Each character candidate record corresponds to each character candidate on a one-to-one basis.

Each character candidate record includes information indicating the position of the corresponding character candidate, a start point number and an end point number (described later in detail) of the corresponding character candidate, a binary image indicating the shape of the character candidate, and a recognition candidate array that includes recognition candidate entries (described later in detail). In this example, the information indicating the position of the character candidate is the X coordinate of the left and right ends of the corresponding character candidate and the Y coordinate of the upper and lower ends, and indicates a circumscribed rectangle of the character candidate on the binary image. The binary image indicating the shape of the character candidate is an image that the pixels on the character candidate are black pixels within the circumscribed rectangle of the character candidate and the remains are white pixels. The value of the recognition candidate entry is set by the recognizer 42, and the value is not set in the candidate detector 36.

Figure 9:
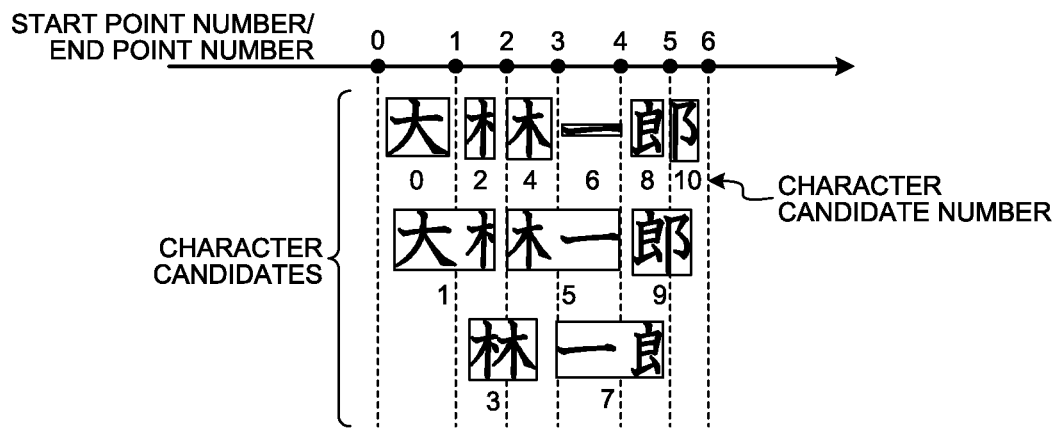
FIG. 9 is a diagram illustrating one example of character candidate numbers.

FIG. 9 is a diagram illustrating one example of character candidate numbers. Each character candidate record is identified by an index of the array. The index of the character candidate record is referred to as a character candidate number. Thus, each character candidate is associated with the character candidate number as illustrated in FIG. 9.

Figure 10:
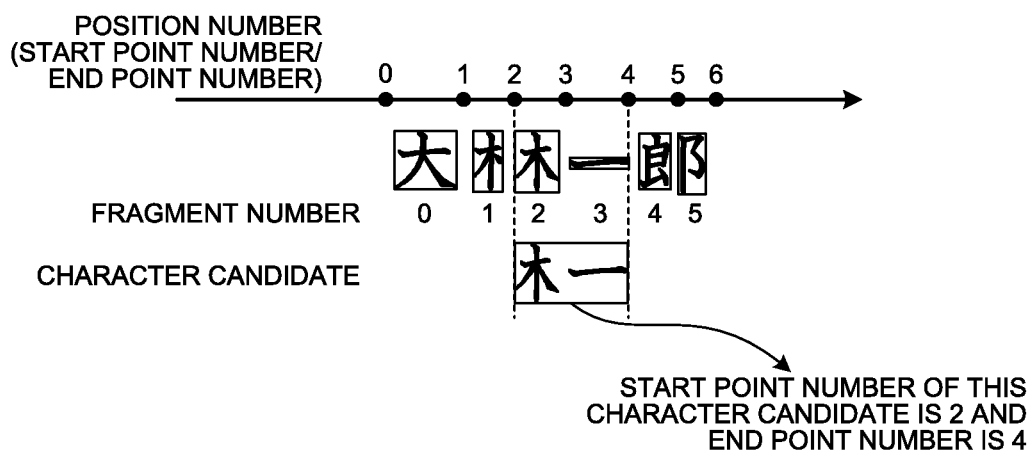
FIG. 10 is a diagram illustrating one example of a start point number and an end point number of a character candidate.

FIG. 10 is a diagram illustrating one example of a start point number and an end point number of character candidates. The character candidate is generated by combining one or more consecutively arranged fragments. Thus, the character candidate can be uniquely identified by the set of a fragment number for the head fragment of the arrangement of the one or more fragments of the original, and a value that is obtained by adding one to the fragment number of the last fragment.

In the present embodiment, the fragment number for the head fragment is referred to as a start point number of the character candidate thereof, and the value that is obtained by adding one to the fragment number of the last fragment is referred to as an end point number of the character candidate. Thus, each character candidate is associated with the start point number and the end point number as illustrated in FIG. 10. Because the start point number and the end point number indicate the delimiter position of the character candidate, both the start point number and the end point number are also collectively referred to as a position number.

FIG. 11 is a diagram illustrating one example of a character candidate matrix. The character candidate matrix is a two-dimensional array of the character candidate numbers with the start point number as a first index and the end point number as a second index as illustrated in FIG. 11. The character candidate matrix is initialized by setting all entries to −1 before starting the generation of the character candidate records. Then, the candidate detector 36 writes the character candidate number in the corresponding entry of the character candidate matrix each time a character candidate is created.

Figure 12:
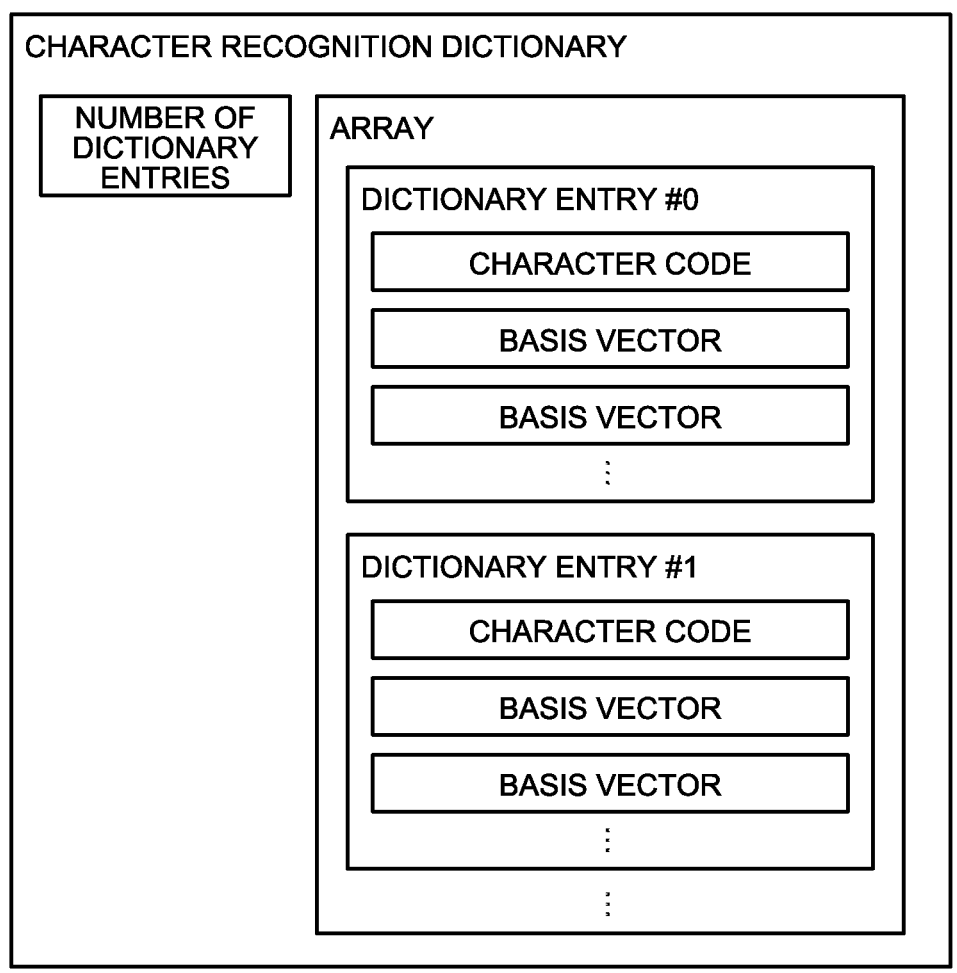
FIG. 12 is a diagram illustrating a configuration of a character recognition dictionary.

FIG. 12 is a diagram illustrating one example of a character recognition dictionary. The character-recognition dictionary storage 40 stores therein the character recognition dictionary prepared beforehand. The character recognition dictionary, as illustrated in FIG. 12, includes a value indicating the number of dictionary entries and an array that stores therein the dictionary entries.

Each dictionary entry includes a character code, and predetermined $D_{sub}$ pieces of basis vectors. The basis vector is a feature vector of a subspace representing a character that corresponds to the character code. The feature vector is calculated, as one example, by dividing the binary image of a corresponding character by any predetermined number in the longitudinal direction and in the lateral direction, obtaining the ratio of the number of black pixels in each divided area, and setting the obtained series of ratios as an element of the feature vector.

Figure 13:
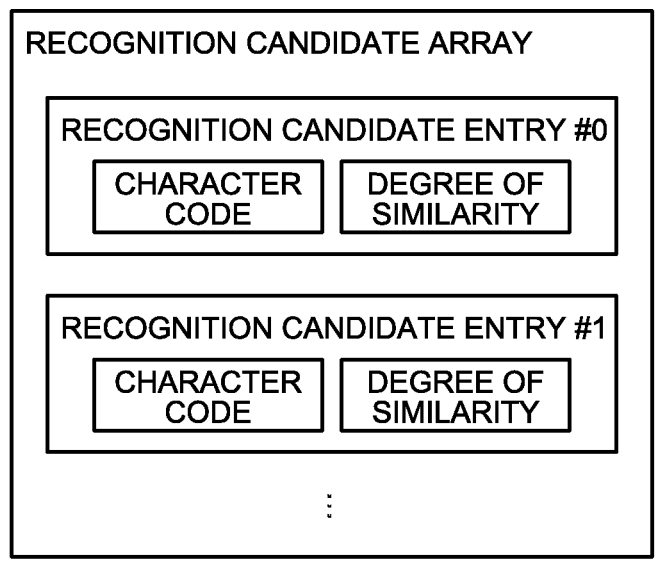
FIG. 13 is a diagram illustrating a configuration of a recognition candidate array.

FIG. 13 is a diagram illustrating a configuration of the recognition candidate array. The recognition candidate array stored in the character candidate record, as illustrated in FIG. 13, includes predetermined $N_{cand}$ pieces of recognition candidate entries. Each recognition candidate entry includes a character code and a degree of similarity.

The recognizer 42 performs character recognition on each character candidate and generates at least one recognition candidate that is a candidate character of the recognition result. In the present embodiment, the recognizer 42 generates predetermined $N_{cand}$ pieces of recognition candidate entries for each character candidate record, and writes them in the recognition candidate array.

More specifically, the recognizer 42 extracts a feature vector from the binary image included in the corresponding character candidate record, matches the feature vector with the basis vectors stored in each dictionary entry of the character recognition dictionary by the subspace method, and calculates the degree of similarity. The recognizer 42, for each dictionary entry of the upper $N_{cand}$ pieces in the degree of similarity, extracts a character code stored in the dictionary entry and generates a recognition candidate entry that includes the extracted character code and the calculated degree of similarity. Then, the recognizer 42 writes the generated $N_{cand}$ pieces of recognition candidate entries to the recognition candidate array of the corresponding character candidate record. Moreover, the recognizer 42 aligns the recognition candidate entries included in the recognition candidate array of each character candidate record in descending order of the degree of similarity.

Figure 14:
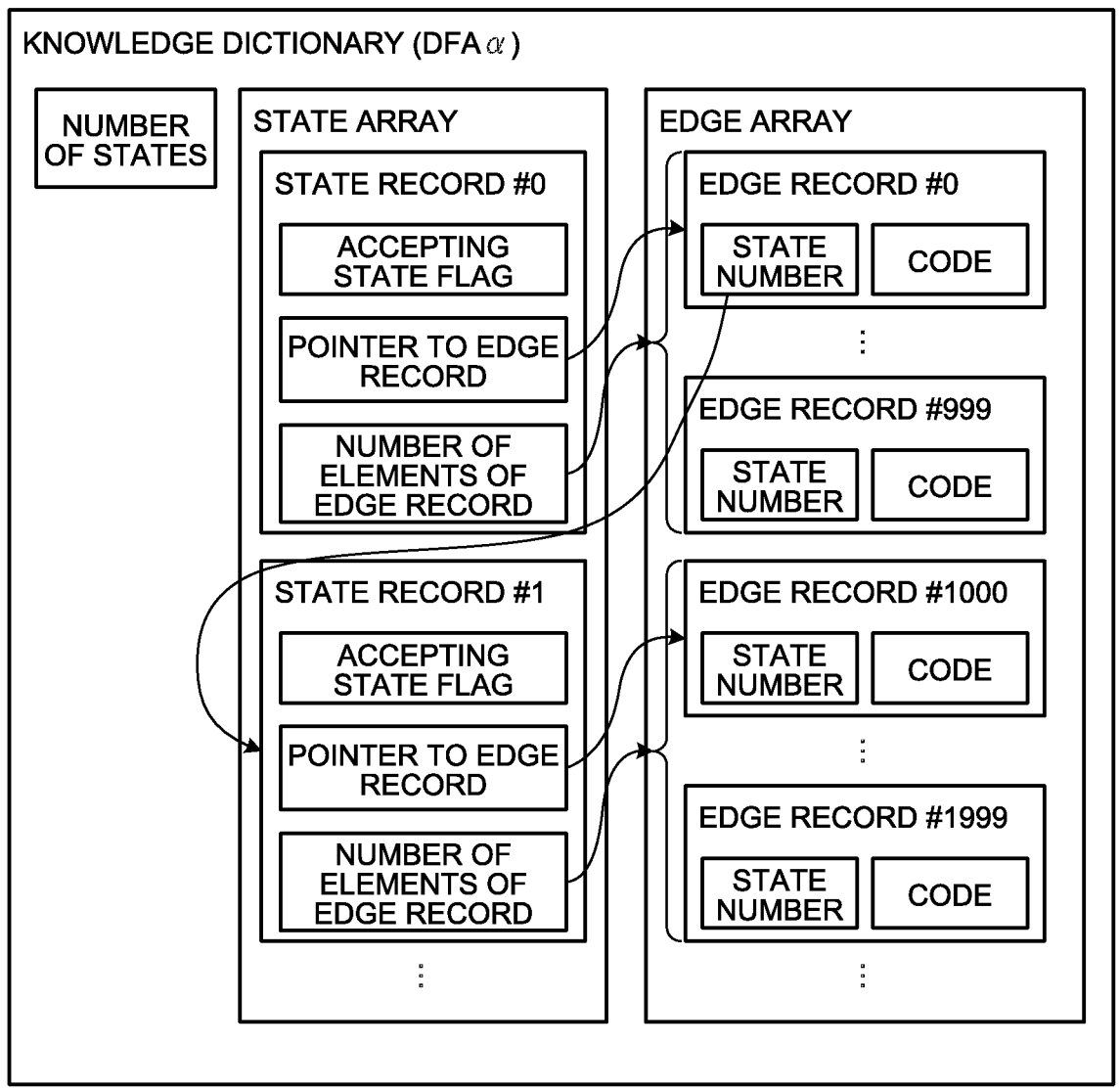
FIG. 14 is a diagram illustrating a configuration of a knowledge dictionary.

FIG. 14 is a diagram illustrating a configuration of a knowledge dictionary. The knowledge-dictionary storage 44 stores therein the knowledge dictionary prepared beforehand by designers and others.

In the present embodiment, the knowledge dictionary is a deterministic finite automaton that contains modeled character strings to be recognized. In the present embodiment, the knowledge dictionary that is a deterministic finite automaton is also referred to as a DFAα. The DFAα is generated by describing, by a designer, a character string to be recognized in regular expression and converting the regular expression into a deterministic finite automaton, for example. A method of generating a nondeterministic finite automaton or a deterministic finite automaton from a regular expression and a method of generating a deterministic finite automaton from a nondeterministic finite automaton are disclosed in A. V. Aho, R. Sethi, J. D. Ullman, translated by Kenichi Harada, Compilers I, first edition 1986, pp. 134-172 and others, for example.

The DFAα, as illustrated in FIG. 14, includes a value indicating the number of states, a state array that stores therein state records for the number of states, and an edge array that stores therein edge records for the number of edges.

Each state record corresponds to each state included in the DFAα on a one-to-one basis and a state is uniquely identified by the number of the state record, that is, the state number. The state array is zero origin, and thus the state of the state number zero is a start state. Each state record includes an accepting state flag, a pointer to an edge record in the edge array, and the number of elements of the edge record.

The accepting state flag indicates whether the state is an accepting state. The accepting state flag, as one example, indicates that it is in the accepting state when the flag is one, and indicates that it is not in the accepting state when it is zero.

The pointer to the edge record indicates, in the edge array, the storage position of a set of edges that leave from the state. The number of elements of the edge record indicates the number of edges that leave from the state. By the pointer to the edge record and the number of elements, the edge records corresponding to all the edges that leave from the state can be identified.

Each edge record corresponds to each edge included in the DFAα on a one-to-one basis. Each edge record includes the state number of the transition destination and a code.

The state number of the transition destination represents the state number that identifies the state of the transition destination by the edge. The state of the state number zero is a start state.

The code represents an input symbol that causes the transition represented by the edge. In the present embodiment, the code stores therein a real character code that represents a character or a virtual character code that specifies a command. In the DFAα, when a real character code is assigned to an edge, a transition from one state to another occurs in accordance with the edge, by the character code that represents the character of a recognition candidate. Furthermore, in the DFAα, when a virtual character code is assigned to an edge, a transition from one state to another occurs in accordance with the edge regardless of the character of the recognition candidate, and a command code specified by the virtual character code is output.

Figure 15:
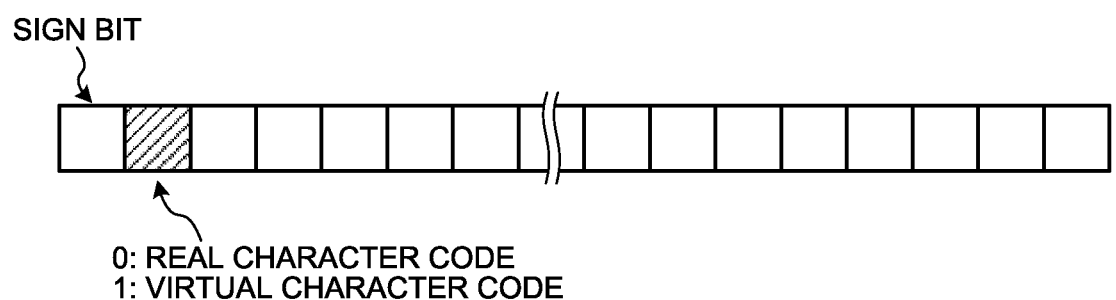
FIG. 15 is a diagram illustrating one example of a code encoding method.

FIG. 15 is a diagram illustrating one example of a code encoding method. In the code included in an edge record of the knowledge dictionary, as one example, the first bit represents a sign bit, and the second bit represents the distinction between a real character code and a virtual character code. For example, when the second bit is zero, it represents a real character code, and when the second bit is one, it represents a virtual character code and a command code described later is specified by the code.

Figure 16:
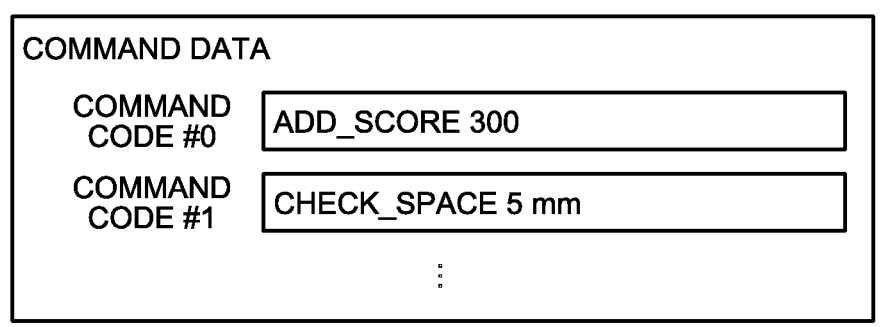
FIG. 16 is a diagram illustrating one example of command data.

FIG. 16 is a diagram illustrating one example of command data. The command processor 51 executes a command interpreter, interprets the command code specified by the virtual character code, and executes the processing defined by the command code. The command data is defined by an array of character strings and is specified by setting a number obtained by replacing the upper two bits of the virtual character code with zeros as the element number of the array, for example. For example, the command code #0 in FIG. 16 is described as "ADD_SCORE 300" in a character string, and is an addition command that adds a specified value of 300 to a score described later. For example, the command code #1 in FIG. 16 is described as "CHECK_SPACE 5 mm" in a character string, and is an interval check command that checks whether the space between characters is 5 mm or greater.

Figure 17:
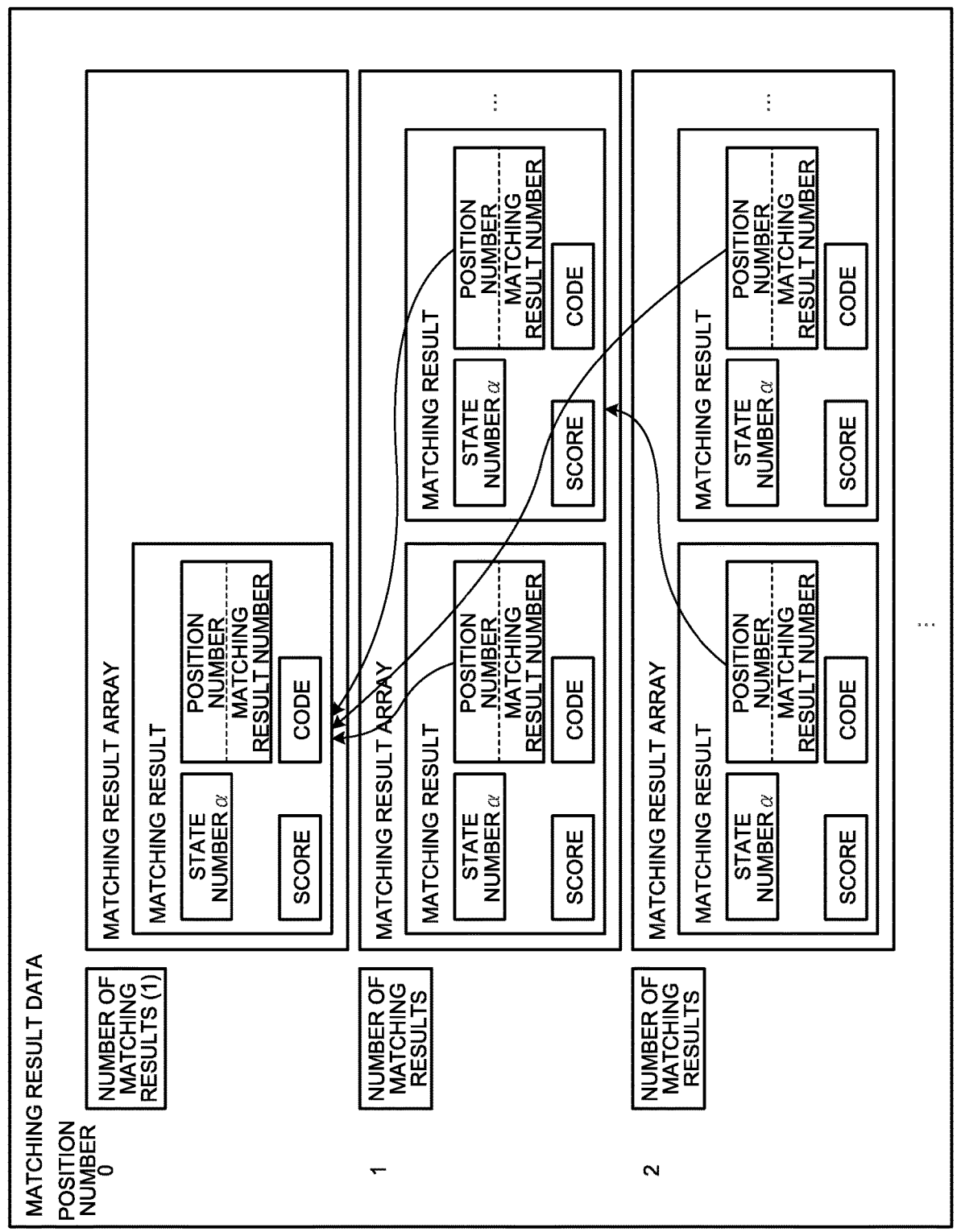
FIG. 17 is a diagram illustrating a configuration of matching result data.

FIG. 17 is a diagram illustrating a configuration of matching result data. The matcher 46 matches each recognition candidate included in the character candidate with the knowledge dictionary in sequence from the head and generates a matching result obtained by matching a character string presumed to be described in the entry frame of the input image with the knowledge dictionary. The matcher 46 then writes the generated matching result into the matching-result storage 48.

The matching-result storage 48 stores therein matching result data. The matching result data includes, for each position number, the number of matching results and a matching result array.

The number of matching results represents the number of matching results associated with the position number. The matching result array stores therein the matching results associated with the position number. Each matching result includes a state number α, a score, a code, and a pair of a position number and a matching result number. Each matching result is uniquely identified by the pair of a position number associated with an array of storage destination, and a number as an array element in the array of storage destination. In the following description, a position number associated with the array of the storage destination of the matching result is referred to as "the position number associated with matching result", and a number as an array element in the array of the storage destination of the matching results is referred to as "the matching result number".

The state number α represents the state of the knowledge dictionary (DFAα). That is, the state number α indicates a state that is reached when the DFAα is shifted in sequence from a start state according to each character from the head recognition candidate to the recognition candidate of the relevant position.

The score represents a value that is obtained by accumulating the degree of similarity associated with each recognition candidate from the head recognition candidate up to the recognition candidate of the relevant position. That is, the score represents the likelihood of the character string from the head recognition candidate to the recognition candidate of the relevant position. The code is a character code representing the character of the recognition candidate of the relevant position.

The pair of the position number and the matching result number represents the position number associated with an immediately preceding matching result and the immediately preceding matching result number in the course of generating the matching results while shifting the DFAα by using the recognition candidates of the character candidate as an input symbol while following up the character candidates one by one from the head to the relevant position. The pair of the position number and the matching result number is referred to when the result extractor 54 extracts the character string of the recognition result.

Figure 18:
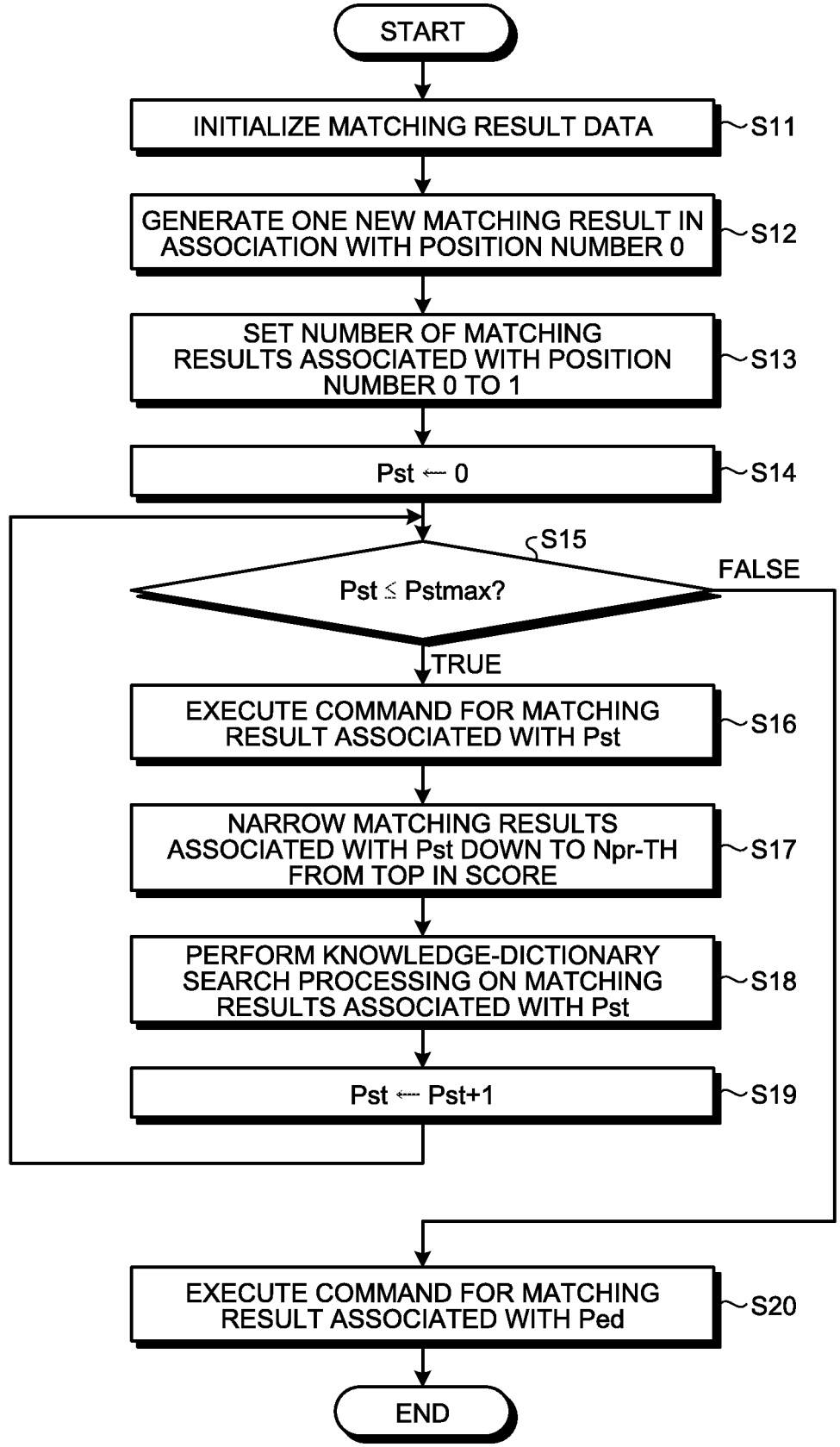
FIG. 18 is a flow diagram illustrating matching processing.

FIG. 18 is a flow diagram illustrating matching processing. The detail of the matching processing indicated at Step S4 in FIG. 2 will be described with reference to FIG. 18.

First, at Step S11, the matcher 46 initializes the matching result data. Specifically, the matcher 46, for all the position numbers of the matching result data, sets the number of matching results to zero and empties the matching result array.

Subsequently, at Step S12, the matcher 46 generates a new single matching result in association with the position number zero. The new single matching result is set such that the state number α is 0, the score is 0, the position number and the matching result number are −1, and the code is −1. Then, at Step S13, the matcher 46 sets the number of matching results, which are associated with the position number 0, to 1. Then, at Step S14, the matcher 46 substitutes 0 for a variable Pst representing the position number.

Subsequently, at Step S15, the matcher 46 determines whether Pst is equal to or less than Pstmax. Pstmax is a value obtained by subtracting one from the last position number Ped. When Pst is equal to or less than Pstmax (True at Step S15), the matcher 46 advances the processing to Step S16.

At Step S16, the matcher 46 determines whether there is an edge to which a virtual character code is assigned, among the edges leaving from the corresponding state. Then, when there is an edge to which a virtual character code is assigned, the matcher 46 shifts the state and gives a command code specified by the virtual character code to the command processor 51 to execute the command. The detail of command execution processing will be described later with reference to FIGS. 21 and 22.

Subsequently, at Step S17, the matcher 46 narrows the matching results associated with Pst down to the Npr-th from the top in the score. That is, the matcher 46 deletes the matching results for which the score is lower than the Npr-th.

Then, at Step S18, the matcher 46 performs knowledge-dictionary search processing on each matching result associated with Pst by using the knowledge dictionary. Consequently, the matcher 46 can generate a new matching result associated with the position number that follows Pst. The knowledge-dictionary search processing will be described later with reference to FIGS. 19 and 20.

Then, at Step S19, the matcher 46 adds one to Pst. Upon completion of Step S19, the matcher 46 returns the processing to Step S15. Then, the matcher 46 repeats the processing from Step S16 to Step S19 until Pst exceeds Pstmax.

When Pst is no longer equal to or less than Pstmax (False at Step S15), the matcher 46 advances the processing to Step S20. At Step S20, the matcher 46 performs the same processing as that at Step S16 on each matching result associated with the last position number Ped. Then, upon completion of the processing at Step S20, the matcher 46 ends this sequence.

Figure 19:
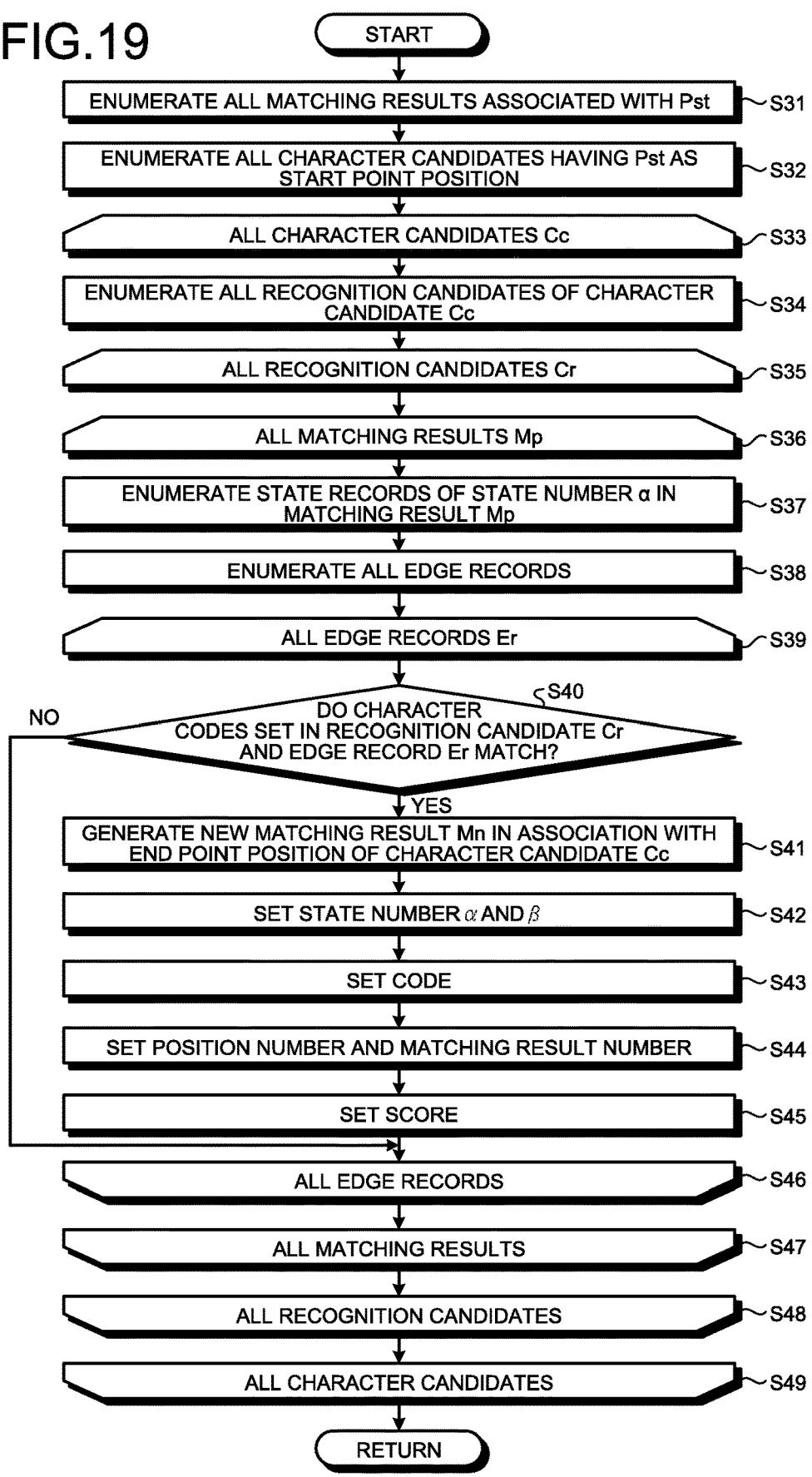
FIG. 19 is a flow diagram illustrating knowledge-dictionary search processing.
Figure 20:
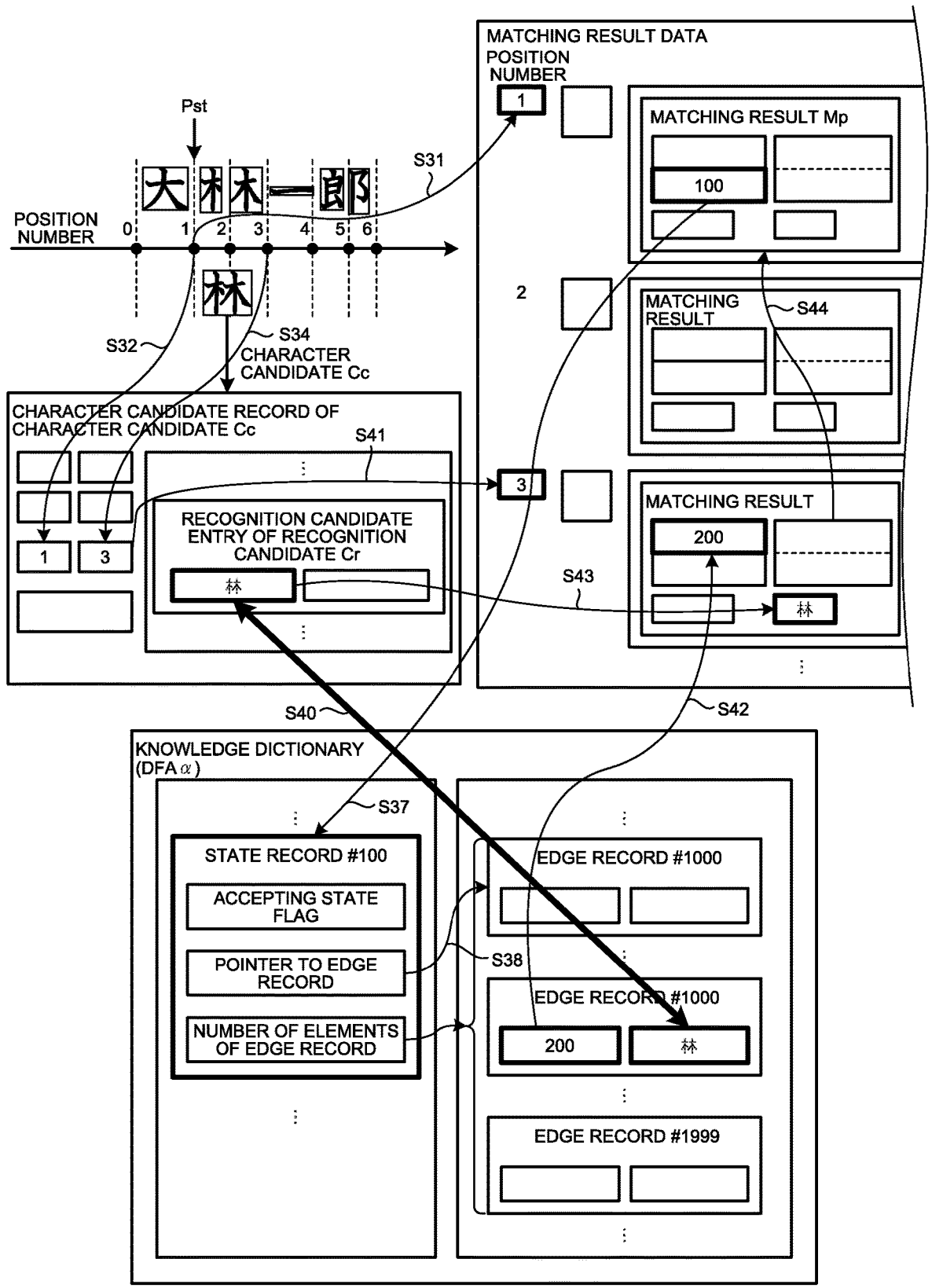
FIG. 20 is a diagram illustrating a sequence of data access in the knowledge-dictionary search processing.

FIG. 19 is a flowchart illustrating the knowledge-dictionary search processing. FIG. 20 illustrates one example of a sequence of data access in the knowledge-dictionary search processing.

With reference to FIGS. 19 and 20, the knowledge-dictionary search processing at Step S18 in FIG. 18 will be described. First, at Step S31, the matcher 46 refers to the matching result data and enumerates all matching results associated with Pst.

Then, at Step S32, the matcher 46 refers to the character candidate records in the array of the character candidate data, and enumerates all character candidates having Pst as the start point position in the array of the character candidate data. The matcher 46 can enumerate all the character candidates having Pst as the start point position, by scanning all entries for which the start point number in the character candidate matrix corresponds to Pst and by collecting the character candidate numbers other than −1.

Subsequently, the matcher 46 performs the processing of Step S34 to Step S48 (loop processing between Step S33 and Step S49) on each of all the character candidate records enumerated at Step S32. In the following description, the character candidate corresponding to a character candidate record to be processed in this loop processing is referred to as "character candidate Cc".

At Step S34, the matcher 46 refers to the recognition candidate array in the character candidate record corresponding to the character candidate Cc, and enumerates all recognition candidate entries of the character candidate.

Then, the matcher 46 performs the processing of Step S36 to Step S47 (loop processing between Step S35 and Step S48) on each of all the recognition candidate entries enumerated at Step S34. In the following description, the recognition candidate corresponding to a recognition candidate entry to be processed in this loop processing is referred to as "recognition candidate Cr".

Subsequently, the matcher 46 performs the processing of Step S37 to Step S46 (loop processing between Step S36 and Step S47) on each of all the matching results associated with Pst enumerated at Step S31. In the following description, the matching result to be processed in this loop processing is referred to as "matching result Mp".

At Step S37, the matcher 46 refers to the knowledge dictionary (DFA$\alpha$), and enumerates the state record corresponding to the state number $\alpha$ included in the matching result Mp to be processed.

Then, at Step S38, the matcher 46 specifies the range, in which the edge records representing edges leaving from the state of the state number $\alpha$ are stored, by the pointer to an edge record and the number of elements of the edge record that are included in the state record enumerated at Step S37, thereby enumerating all edge records representing the edges leaving from the state of the state number $\alpha$.

Subsequently, the matcher 46 performs the processing of Step S40 to Step S45 (loop processing between Step S39 and Step S46) on each of all the edge records enumerated at Step S38. In the following description, the edge record to be processed in this loop processing is referred to as "edge record Er".

At Step S40, the matcher 46 determines whether the character code set in the recognition candidate entry of the recognition candidate Cr and the character code set in the edge record Er match. When they do not match (No at Step S40), the matcher 46 transfers the processing to the next edge record and repeats the processing from Step S40. When they match (Yes at Step S40), the matcher 46 advances the processing to Step S41.

At Step S41, the matcher 46 generates a new matching result Mn in association with the end point position of the character candidate record of the character candidate Cc and writes it in the matching result data.

Then, at Step S42, the matcher 46 sets the state number (the state number of the transition destination) that is set in the edge record Er to the new matching result Mn as the state number $\alpha$.

Then, at Step S43, the matcher 46 sets the character code set in the recognition candidate entry of the character candidate Cr to the new matching result Mn as the code.

Then, at Step S44, the matcher 46 sets the position number Pst, with which the matching result Mp is associated, to the new matching result Mn as the position number. The matcher 46 further stores the number of the matching result Mp to be processed to the new matching result Mn as the matching result number.

Then, at Step S45, the matcher 46 sets the value obtained by adding the score stored in the matching result Mp to be processed to the degree of similarity stored in the recognition candidate entry of the recognition candidate Cr to the new matching result Mn as the score.

At Step S46, upon completion of the processing of Step S40 to Step S45 for all the edge records, the matcher 46 exits from the loop and advances the processing to Step S47.

At Step S47, upon completion of the processing of Step S37 to Step S46 for all the matching results associated with Pst, the matcher 46 exits from the loop and advances the processing to Step S48.

At Step S48, upon completion of the processing of Step S36 to Step S47 for all the recognition candidate entries corresponding to the character candidate Cc, the matcher 46 exits from the loop and advances the processing to Step S49.

Then, at Step S49, upon completion of the processing of Step S34 to Step S48 for all the character candidate records, the matcher 46 exits from the loop and ends this sequence.

As just described, the matcher 46 writes the number (state number $\alpha$) indicating the state of the knowledge dictionary (DFA$\alpha$) reached by matching into the matching result of a first character candidate. Then, in matching a second character candidate that is subsequent to the first character candidate with the knowledge dictionary (DFA$\alpha$), the matcher 46 matches the second character candidate by following up the edges corresponding to the state transition by the recognition candidates of the second character candidate from the state indicated in the number (state number $\alpha$) written in the matching result of the first character candidate.

Figure 21:
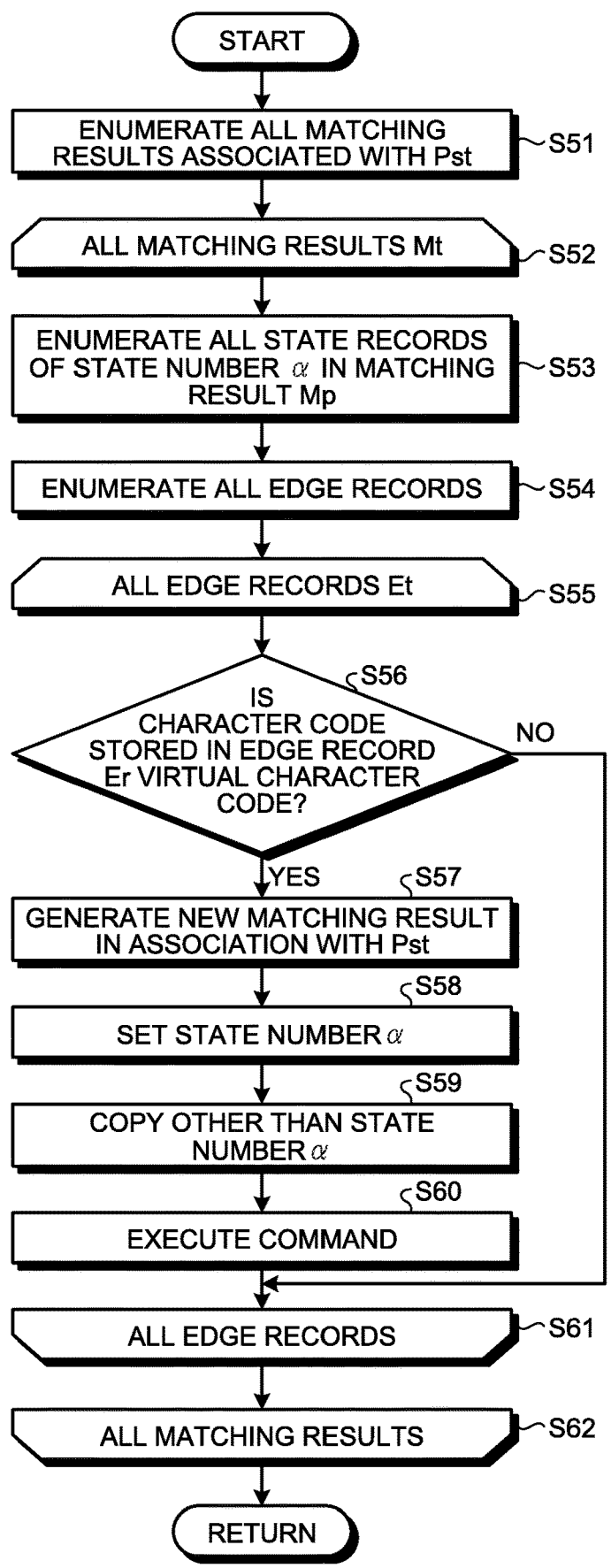
FIG. 21 is a flow diagram illustrating command execution processing.
Figure 22:
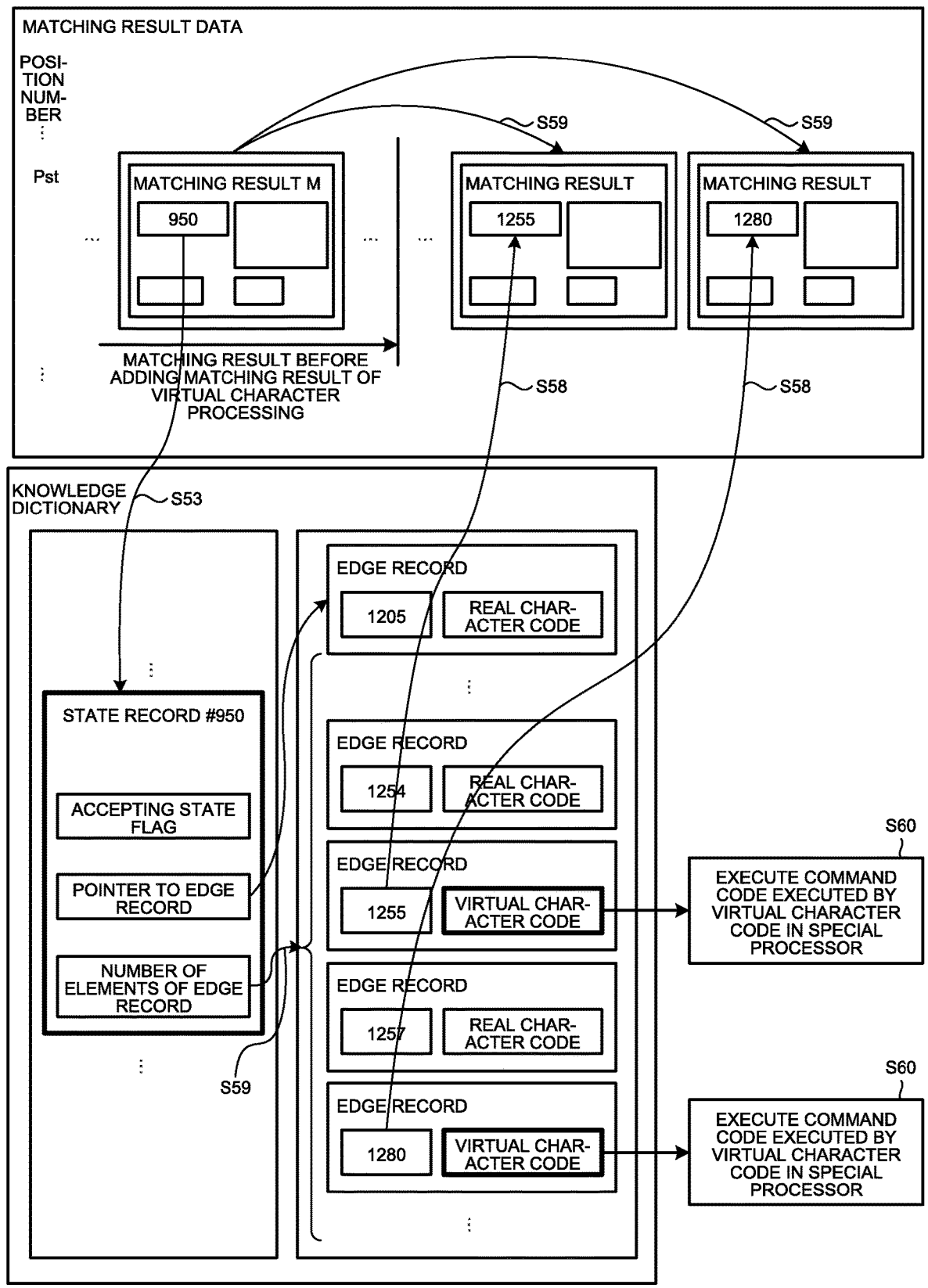
FIG. 22 is a diagram illustrating one example of a sequence of data access in the command execution processing.
Figure 23:
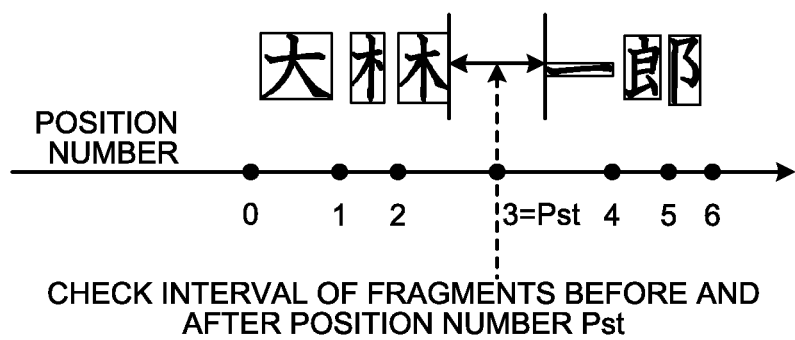
FIG. 23 is a diagram illustrating a situation of checking a space between characters.

FIG. 21 is a flowchart illustrating command execution processing. FIG. 22 illustrates a flow of data in the command execution processing. FIG. 23 is a diagram illustrating a situation of checking a space between characters.

With reference to FIGS. 21 and 22, the command execution processing at Step S16 in FIG. 18 will be described. First, at Step S51, the matcher 46 refers to the matching result data and enumerates all matching results associated with Pst.

Subsequently, the matcher 46 performs the processing of Step S53 to Step S61 (loop processing between Step S52 and Step S62) on each of all the matching results associated with Pst enumerated at Step S51. In the following description, the matching result to be processed in this loop processing is referred to as "matching result Mp".

At Step S53, the matcher 46 refers to the knowledge dictionary (DFA$\alpha$), and enumerates the state record corresponding to the state number $\alpha$ set in the matching result Mp to be processed.

Then, at Step S54, the matcher 46 refers to the pointer to the edge record set in the state record enumerated at Step S53 and the number of elements of the edge record, and enumerates all edge records representing edges leaving from the state of the state number $\alpha$.

Subsequently, the matcher 46 performs the processing of Step S56 to Step S60 (loop processing between Step S55 and Step S61) on each of all the edge records enumerated at Step S54. In the following description, the edge record to be processed in this loop processing is referred to as "edge record Er".

At Step S56, the matcher 46 determines whether the code of the edge record Er is a virtual character code. The matcher 46, as one example, detects the second bit from the head of the code and determines whether it is a virtual character code. When it is not a virtual character code (No at Step S56), the matcher 46 transfers the processing to the next edge record and repeats the processing from Step S56. When it is a virtual character code (Yes at Step S56), the matcher 46 advances the processing to Step S57.

At Step S57, the matcher 46 generates a new matching result Mn in association with Pst and writes it in the matching result data.

Then, at Step S58, the matcher 46 sets the state number (the state number of the transition destination) that is set in the edge record Er to the new matching result Mn as the state number α.

Then, at Step S59, the matcher 46 copies, as the elements other than the state number α (the score, the code, the position number, and the matching result number), the corresponding values of the matching result Mp to the new matching result Mn. Accordingly, the matcher 46 can shift the state in accordance with the edge to which the virtual character code is assigned.

Subsequently, at Step S60, the matcher 46 invokes the command processor 51 and gives a command code specified by the virtual character code to execute the command. The command processor 51 implements a command interpreter, and thus interprets the given command code and executes the processing defined by the command code.

For example, when an addition command "ADD_SCORE" is given, the command processor 51 adds a value specified by the argument to the score of the corresponding matching result. Thus, the command processor 51 can manipulate the evaluation of the likelihood of a character string by adding a weight to the score in the case of a predetermined condition.

Furthermore, for example, when a command code that includes an interval check command "CHECK_SPACE" is executed while processing the matching result Mp associated with the position number Pst at Step S60 in FIG. 21, as illustrated in FIG. 23, the command processor 51 checks the interval between the fragments immediately before and immediately after the position number Pst, thereby checking the space between characters before and after the position number Pst. Then, the command processor 51 deletes the matching result Mp when the interval is equal to or less than a specified distance. Thus, the command processor 51 can check the delimiter space between a family name and a personal name and, when a space longer than a predetermined distance is not detected, delete the matching result.

Subsequently, at Step S61, upon completion of the processing of Step S56 to Step S60 for all the edge records, the matcher 46 exits from the loop and advances the processing to Step S62.

At Step S62, upon completion of the processing of Step S53 to Step S61 for all the matching results associated with Pst, the matcher 46 exits from the loop and ends this sequence.

As just described, the matcher 46 writes the number (state number α) indicating the state of the knowledge dictionary (DFAα) reached by matching into the matching result of a first character candidate. Then, in matching a second character candidate that is subsequent to the first character candidate with the knowledge dictionary (DFAα), the matcher 46 matches the second character candidate by following up the edges corresponding to the state transition by the recognition candidates of the second character candidate from the state indicated in the number (state number α) written in the matching result of the first character candidate, and generates the matching result of the second character candidate.

Moreover, when an edge to which a virtual character code is assigned is detected, the matcher 46 can shift the state in accordance with the edge, and give a command code specified by the virtual character code to the command processor 51 to execute the command.

Figure 24:
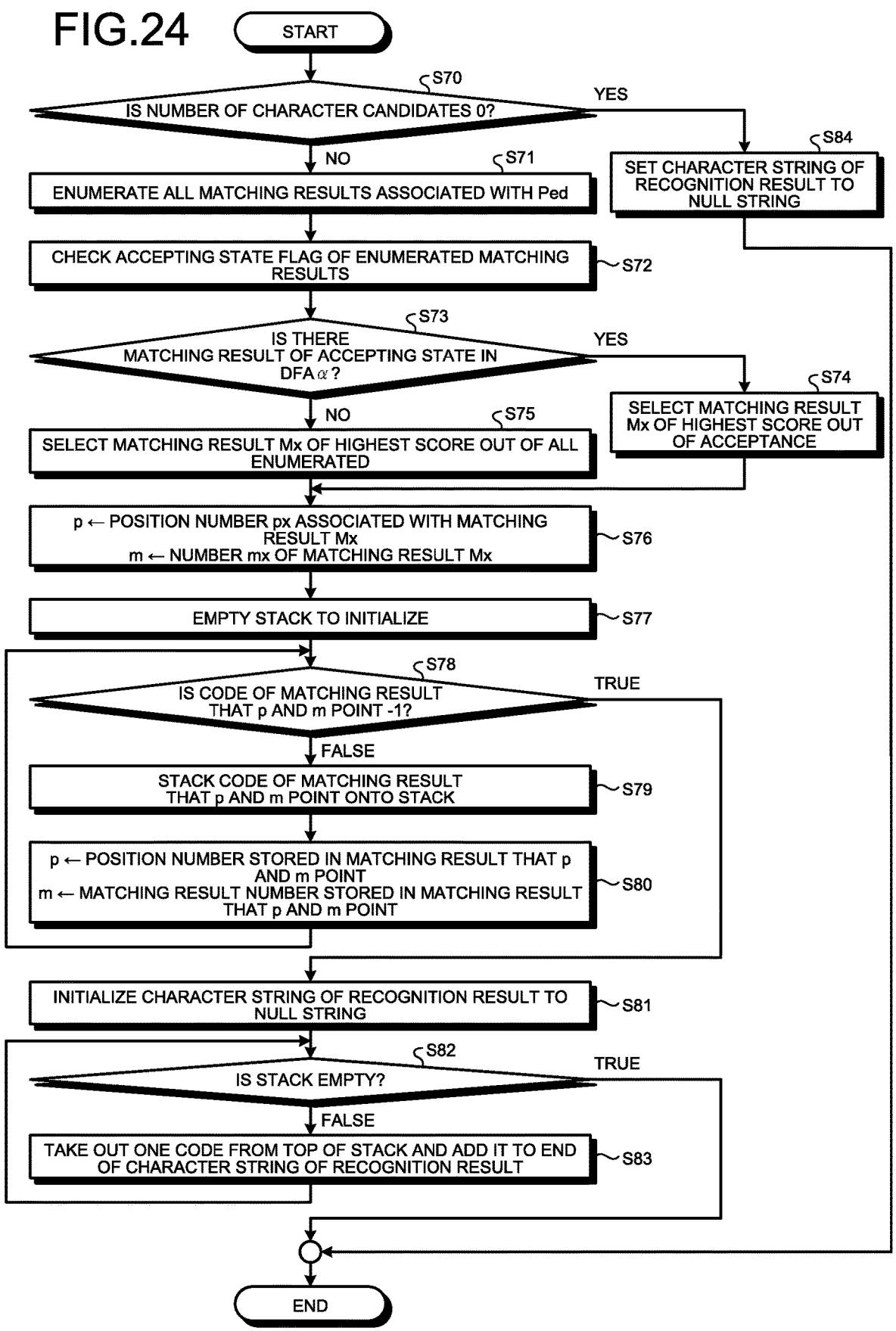
FIG. 24 is a flow diagram illustrating a sequence of result extraction processing.
Figure 25:
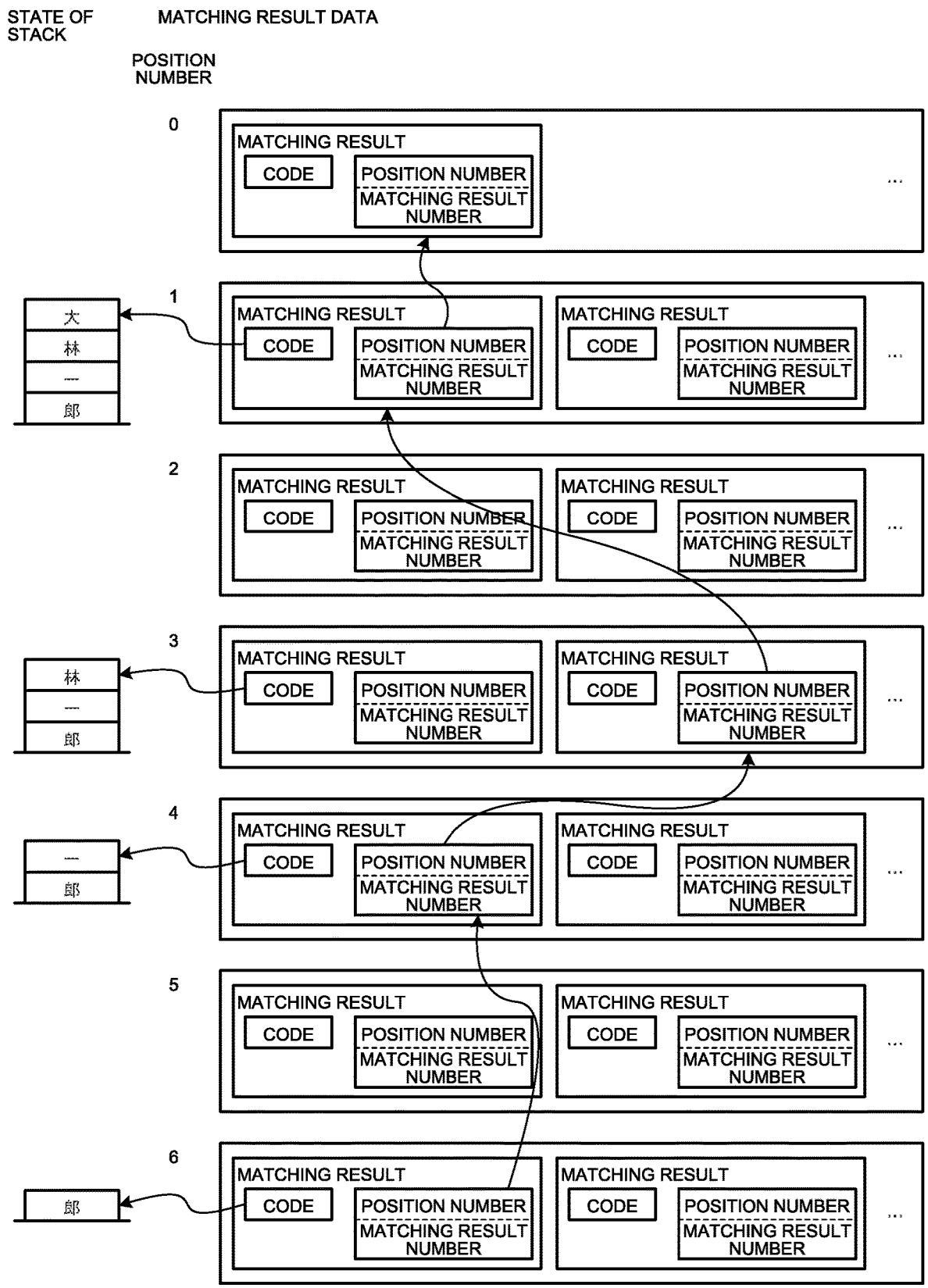
FIG. 25 is a diagram illustrating one example of data referred to and character codes stacked on a stack in the result extraction.

FIG. 24 is a flow diagram illustrating a sequence of extraction processing of character string performed by the result extractor. FIG. 25 is a diagram illustrating a situation of data referred to and character codes stacked on a stack in result extraction.

The result extraction indicated at Step S5 in FIG. 2 is performed by the result extractor 54. The following describes the detail of the result extraction with reference to FIGS. 24 and 25. First, at Step S70, the result extractor 54 checks whether the number of character candidates is zero. When the number of character candidates is zero, the result extractor 54 sets the character string of the recognition result to a null string at Step S84, and ends this sequence. When the number of character candidates is not zero, at Step S71, the result extractor 54 performs the processing of Step S72 and later steps, after enumerating all matching results associated with the last position number Ped.

Subsequently, at Step S72, the result extractor 54, for each of the enumerated matching results at Step S71, acquires the state record corresponding to the state number α from the knowledge dictionary (DFAα) and checks the accepting state flag.

Then, at Step S73, the result extractor 54 determines if there is a matching result for which the state corresponding to the state number α is in the accepting state. In the following description, the matching result for which the state corresponding to the state number α is in the accepting state is referred to as "matching result of accepting state in DFAα". When there is a matching result of accepting state in DFAα (Yes at Step S73), at Step S74, the result extractor 54 selects, out of the matching results of accepting state in DFAα, the matching result of the highest score as a matching result Mx. When there is no matching result of accepting state in DFAα (No at Step S73), at Step S75, the result extractor 54 selects, out of all the enumerated matching results, the matching result of the highest score as the matching result Mx.

Subsequent to the processing of Step S74 or Step S75, at Step S76, the result extractor 54 substitutes a position number px, with which the selected matching result Mx is associated, for a variable p representing the position number. The result extractor 54 further substitutes the number mx of the selected matching result Mx for a variable m representing the matching result number.

Then, at Step S77, the result extractor 54 empties a stack that is a first-in last-out (FILO) memory.

Subsequently, at Step S78, it is determined whether the code of the matching result that the p and m point is −1. When the matching result that the p and m point is not −1 (False at Step S78), the result extractor 54 advances the processing to Step S79.

At Step S79, the result extractor 54 stacks, onto the stack, the code stored in the matching result that the p and m point. Then, at Step S80, the result extractor 54 substitutes the position number stored in the matching result that the p and m point for the p, and substitutes the matching result number stored in the matching result that the p and m point for the m.

Then, upon completion of the processing at Step S80, the result extractor 54 returns the processing to Step S78 and, until the code stored in the matching result that the p and m point becomes −1, repeats the processing of Step S79 and Step S80. Accordingly, the result extractor 54 can, as illustrated in FIG. 25, select the character codes from the end of the character string in sequence and stack them onto the stack.

When the code of the matching result that the p and m point is −1 (True at Step S78), that is, when the position number points the matching result associated with 0, the result extractor 54 advances the processing to Step S81. At Step S81, the result extractor 54 initializes the character string of the recognition result stored in the memory to a null string.

Subsequently, at Step S82, it is determined whether the stack is empty. When the stack is not empty (False at Step S82), the result extractor 54, at Step S83, takes out a single code from the top of the stack and adds it to the end of the character string of the recognition result stored in the memory.

Upon completion of the processing at Step S83, the result extractor 54 returns the processing to Step S82 and, until the stack becomes empty, repeats the processing of Step S83. Accordingly, the result extractor 54 can generate the character string from the head to the end.

Then, when the stack becomes empty (True at Step S82), the result extractor 54 ends the processing of this sequence.

As just described, the recognition device 10 in the present embodiment can perform character recognition by using the knowledge dictionary and execute the processing different from the matching processing in synchronization with the matching processing.

Figure 26:
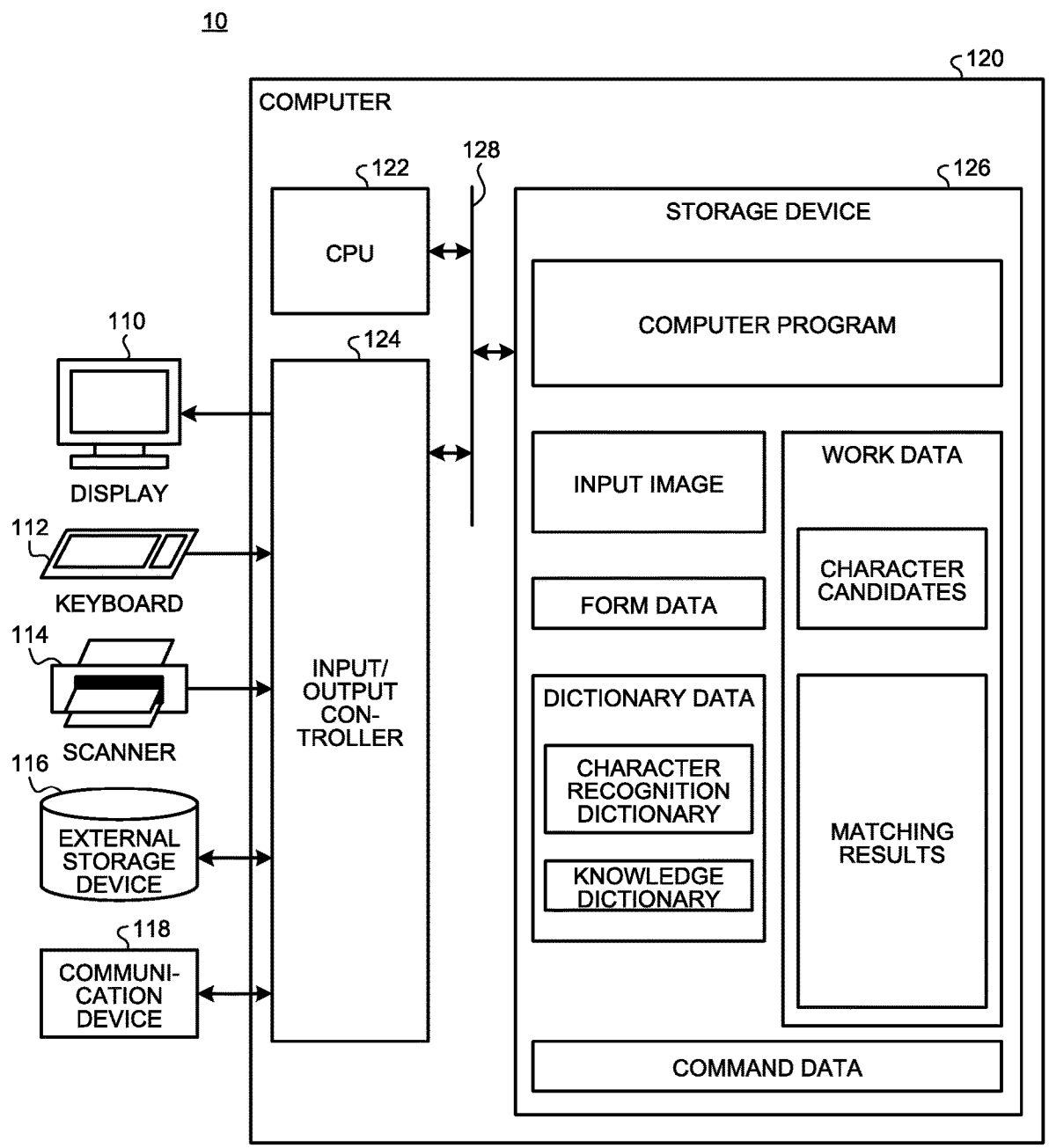
FIG. 26 is a block diagram illustrating a hardware configuration of the recognition device in the embodiment.

FIG. 26 is a block diagram illustrating a hardware configuration of the recognition device 10 in the embodiment.

The recognition device 10 can be implemented by a commonly used computer system capable of executing a computer program. The recognition device 10 includes, as one example, a display 110, a keyboard 112, a scanner 114, an external storage device 116, a communication device 118, and a computer 120.

The display 110 is a display device, and displays the recognized character strings and others. The keyboard 112 is an input device, and receives the operation from a user and inputs information. The scanner 114 reads information written on a form or the like and acquires an input image or the like. The external storage device 116 is a hard disk drive, an optical disc drive, or the like, and stores therein a variety of information. The communication device 118 inputs and outputs information with an external computer or the like via the Internet and the like and, for example, acquires an input image from the outside and outputs a character string to the outside.

The computer 120 includes, as one example, a CPU 122, an input/output controller 124, and a storage device 126. The CPU 122, the input/output controller 124, and the storage device 126 are coupled by a bus 128.

The CPU 122 executes a computer program and controls the entire recognition device 10. The input/output controller 124 is an interface with the display 110, the keyboard 112, the scanner 114, the external storage device 116, the communication device 118, and others. The input/output controller 124 further controls data transfer and the like via the bus 128.

The storage device 126 includes a ROM, a RAM, a hard disk drive, and the like. In the storage device 126, it is possible to access any device such as the ROM, the RAM, the hard disk drive, and the like by an identical address space. The storage device 126 stores therein computer programs, input images, form data, dictionary data (character recognition dictionary and knowledge dictionary), work data (character candidates and matching results), command data, and the like. The foregoing data may be stored in any device (ROM, RAM, and hard disk drive) constituting the storage device. Furthermore, a part or a whole of these pieces of data may be stored in the external storage device 116, or in a server or the like accessed via the communication device 118.

The computer program executed by the recognition device 10 of the present embodiment is provided in a file of an installable format or of an executable format recorded on a computer-readable recording medium such as a CD-ROM, a flexible disk (FD), a CD-R, and a DVD, which may be provided as a computer program product. Furthermore, the computer program executed by the recognition device 10 of the present embodiment may be stored in a computer connected to a network such as the Internet, and be provided by downloading via the network. The computer program executed by the recognition device 10 of the present embodiment may be provided or distributed via a network such as the Internet.

The computer program executed by the recognition device 10 of the present embodiment is in a modular configuration including the above-described various units (the input unit 30, the candidate detector 36, the recognizer 42, the matcher 46, the command processor 51, the result extractor 54, and the output unit 56). As the actual hardware, it is configured such that, as the CPU (processor) reads out and executes the computer program from the above-described storage medium, the above-described various units are loaded on a main storage device, and such that the input unit 30, the candidate detector 36, the recognizer 42, the matcher 46, the command processor 51, the result extractor 54, and the output unit 56 are generated on the storage device 126. A part or a whole of the input unit 30, the candidate detector 36, the recognizer 42, the matcher 46, the command processor 51, the result extractor 54, and the output unit 56 may be configured by hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition device comprising:
   a hardware processor configured to:
   detect a character candidate that is a set of pixels presumed to contain a character from an input image;
   recognize each character candidate and generate at least one recognition candidate that is a candidate character of a recognition result;
      match each of the at least one recognition candidate with knowledge dictionary information that contains modeled character strings to be recognized; and
      generate a matching result obtained by matching a character string presumed to be included in the input image with the knowledge dictionary information, wherein
   the knowledge dictionary information is a finite automaton, and any one of a real character code that represents a character and a virtual character code that specifies a command is assigned to an edge, and
   the hardware processor is further configured to execute, when shifting a state of the knowledge dictionary information in accordance with an edge to which the virtual character code is assigned, a command specified by the virtual character code assigned to the edge.

2. The device according to claim 1, wherein
the hardware processor generates matching results that include a score representing likelihood of a corresponding character string, and
the hardware processor is further configured to select one matching result from the matching results based on the score and extract a character string identified by the selected matching result.

3. The device according to claim 2, wherein the hardware processor executes an addition command for adding a specified value to a score of a corresponding matching result, as the command specified by the virtual character code.

4. The device according to claim 2, wherein the hardware processor executes an interval check command for checking a space between characters before and after a position associated with a matching result and for deleting, when the space is equal to or less than a specified distance, a corresponding matching result, as the command specified by the virtual character code.

5. The device according to claim 2, wherein
the knowledge dictionary information is a deterministic finite automaton, and
the hardware processor writes a number indicating a state of the deterministic finite automaton reached by matching to a matching result of a first character candidate and, in matching a second character candidate that is subsequent to the first character candidate with the deterministic finite automaton, matches the second character candidate by following up edges corresponding to state transition by recognition candidates of the second character candidate from the state indicated in the number written in the matching result of the first character candidate.

6. A recognition device comprising,
a hardware processor configured to:
detect a character candidate that is a set of pixels presumed to contain a character from an input image;
recognize each character candidate and generate at least one recognition candidate that is a candidate character of a recognition result;
match each of the at least one recognition candidate with knowledge dictionary information that contains modeled character strings to be recognized;
generate a matching result obtained by matching a character string presumed to be included in the input image with the knowledge dictionary information; and
execute a given command, wherein
the knowledge dictionary information is a deterministic finite automaton, and a character code is assigned to an edge, and
the hardware processor writes a number indicating a state of the deterministic finite automaton reached by matching to a matching result of a first character candidate and, in matching a second character candidate that is subsequent to the first character candidate with the deterministic finite automaton, matches the second character candidate by following up edges corresponding to state transition by recognition candidates of the second character candidate from the state indicated in the number written in the matching result of the first character candidate, and generates a matching result of the second character candidate.

7. A recognition method comprising:
detecting a character candidate that is a set of pixels presumed to contain a character from an input image;
recognizing each character candidate to generate at least one recognition candidate that is a candidate character of a recognition result;
matching each of the at least one recognition candidate with knowledge dictionary information that contains modeled character strings to be recognized to generate a matching result obtained by matching a character string presumed to be included in the input image with the knowledge dictionary information; and
executing a given command, wherein
the knowledge dictionary information is a finite automaton, and any one of a real character code that represents a character and a virtual character code that includes a command is assigned to an edge, and
the matching includes executing, when shifting a state of the knowledge dictionary information in accordance with an edge to which the virtual character code is assigned, a command included in the virtual character code assigned to the edge.

8. A computer program product comprising a non-transitory computer-readable medium containing a program, wherein the program, when executed by a computer, causes the computer to execute:
detecting a character candidate that is a set of pixels presumed to contain a character from an input image;
recognizing each character candidate to generate at least one recognition candidate that represents a candidate character of a recognition result;
matching each of the at least one recognition candidate with knowledge dictionary information that contains modeled character strings to be recognized to generate a matching result obtained by matching a character string presumed to be included in the input image with the knowledge dictionary information; and
executing a given command, wherein
the knowledge dictionary information is a finite automaton, and any one of a real character code that represents a character and a virtual character code that specifies a command is assigned to an edge, and
the matching includes executing, when shifting a state of the knowledge dictionary information in accordance with an edge to which the virtual character code is assigned, a command included in the virtual character code assigned to the edge.

* * * * *